(12) United States Patent
Yang et al.

(10) Patent No.: US 12,479,962 B2
(45) Date of Patent: Nov. 25, 2025

(54) FRACTIONATION OF WOODY BIOMASS USING PHENOL-4-SULFONIC ACID (PSA)

(71) Applicant: THE BOARD OF TRUSTEES OF WESTERN MICHIGAN UNIVERSITY, Kalamazoo, MI (US)

(72) Inventors: Qiang Yang, Portage, MI (US); Duo He, Kalamazoo, MI (US)

(73) Assignee: The Board of Trustees of Western Michigan University, Kalamazoo, MI (US)

( * ) Notice: Subject to any disclaimer, the term of this patent is extended or adjusted under 35 U.S.C. 154(b) by 739 days.

(21) Appl. No.: 17/746,346

(22) Filed: May 17, 2022

(65) Prior Publication Data

US 2022/0380555 A1 Dec. 1, 2022

Related U.S. Application Data

(60) Provisional application No. 63/191,154, filed on May 20, 2021.

(51) Int. Cl.
*C08H 8/00* (2010.01)
(52) U.S. Cl.
CPC ...................... *C08H 8/00* (2013.01)
(58) Field of Classification Search
CPC ....................................... C08H 8/00
USPC ...................................... 530/507
See application file for complete search history.

(56) References Cited

U.S. PATENT DOCUMENTS 10,239,905 B2 3/2019 Zhu et al.

FOREIGN PATENT DOCUMENTS

WO WO-2005058856 A1 * 6/2005 ............... C08H 8/00

OTHER PUBLICATIONS

Duo He, Yunxuan Wang, Chang Geun Yoo, Qi-Jie Chenc and Qiang Yang, "The fractionation of woody biomass under mild conditions using bifunctional phenol-4-sulfonic acid as a catalyst and lignin solvent," 5414-5422, The Royal Society of Chemistry, Jul. 14, 2020.
Wilkerson et al., "Monolignol Ferulate Transferase Introduces Chemically Labile Linkages into the Lignin Backbone," Science, Apr. 3, 2014, 5 pages.
Alonso et al., "Increasing the revenue from lignocellulosic biomass: Maximizing feedstock utlization," Science Advances, 2017, 7 pages.
Schutyser et al., "Chemicals from lignin: an interplay of lignocellulose fractionation, depolymerisation, and upgrading," Royal Society of Chemistry, Jan. 10, 2018, 61 pages.
Rinaldi et al., "Paving the Way for Lignin Valorisation: Recent Advances in Bioengineering, Biorefining and Catalysis," Angewandte Chemie., Jun. 17, 2016, 52 pages.
Shuai et al., "Formaldehyde stabilization facilitates lignin monomer production during biomass depolymerization," Sciencemag.org, Oct. 27, 2016, 6 pages.
Lan et al. "Protection Group Effects During a,y-Diol Lignin Stabilization Promote High-Selectivity Monomer Production," Angewandte Chemie, Jan. 10, 2018, 5 pages.

(Continued)

*Primary Examiner* — David T Karst

(57) ABSTRACT

A method of fractionating lignocellulosic biomass includes fractionating lignocellulos biomass in an aqueous phenol-4-sulfonic acid (PSA). The process may provide complete or nearly complete fractionation under mild conditions.

10 Claims, 33 Drawing Sheets

(56) References Cited

OTHER PUBLICATIONS

Liao et al., "A sustainable wood biorefinery for low-carbon footprint chemicals production," Science.org, Feb. 13, 2020, 6 pages.
Dong et al., "Diol pretreatment to fracitonate a reactive lignin in lignocellulosic biomass biorefineries," 2019, 31 pages.
Gogoi et al., "Novel low temperature, low energy and high efficiency pretreatment technology for large wood chips with a redox couple catalyst," Chemistry & Sustainability, Jan. 2018.
Sun et al., "Bright Side of Lignin Depolymerization: Toward New Platform Chemicals," Nov. 4, 2021 65 pages.
Shuai et al., "Comparative study of SPORL and dilute-acid pretreatments of spruce for cellulosic ethanol production," Jan. 12, 2010, 9 pages.
Grande et al., "Fractionation of lignocellulosic biomass using the OrganoCat process," Royal Society of Chemistry, Apr. 3, 2015, 7 pages.
Fleiter et al, "Energy efficiency in the German pulp and paper industry—A model-based assessment of saving potentials," Mar. 17, 2012, 16 pages.
Fracaro et al, "Energy Efficiency in the Brazilian Pul and Paper Industry," Sep. 17, 2012, 23 pages.
Laurijssen et al., "Benchmarking energy use in the paper industry: a benchmarking study on process unit level," Jul. 13, 2012, 15 pages.
Williams et al., "Influence of mill type on densified biomass comminution," Applied Energy, Aug. 28, 2016, 13 pages.
Questell-Santiago et al, "Carbohydrate stabilization extends the kinetic limits of chemical polysaccharide depolymerization," Sep. 17, 2018, 7 pages.
Gurnagul et al., "The effect of cellulose degradation of the strength of wood pulp fibres," Nordic Pulp & Paper Research Journal, No. 3-1992 7 (1992) 3 pages.
Van Osch et al., "Ionic liquids and deep eutectic solvents for lignocellulosic biomass fractionation," Eindhoven University of Technology, Feb. 12, 2016, 32 pages.
Socha et al., "Efficient biomass pretreatment using ionic liquids derived from lignin and hemicellulose," Aug. 18, 2014, 9 pages.
Kim et al., "Biomass pretreatment using deep eutectic solvents from lignin derived phenols," Jan. 9, 2018, 7 pages.
Jiang et al., "Characterization of Micronized Wood and Energy-size Relationship in Wood," Jun. 15, 2017, 24 pages.
Kim et al., "Promise of combined hydrothermal/chemical and mechanical refining for pretreatment of woody and herbaceous biomass," Apr. 30, 2016, 15 pages.
Karinkanta et al, Fine grinding of wood-Overview from wood breakage to applications, Mar. 17, 2018, 3 pages.
Yang et al., "Correlation Between Lignin Physicochemical Properties and Inhibition to Enzymatic Hydrolysis of Cellulose," Dec. 30, 2015, 12 pages.
Yoo et al, "Insights of biomass recalcitrance in natural Populus trichocarpa variants for biomass conversion," Nov. 21, 2017, 14 pages.
E. Brännvall, "The Limits of Delignification in Kraft Cooking," Bioresources, Jan. 23, 2017, 27 pages.
Redman et al., "Mass Transfer Properties (Permeability and Mass Diffusivity) of Four Australian Hardwood Species," Jun. 2012, 15 pages.
Ahmed et al., "Liquid penetration in different cells of two hardwood species," Mar. 17, 2011, 10 pages.
Ra et al., "Determination of Boron Diffusion Coefficients in Wood," Jun. 5, 2007, 15 pages.
Chen et al., "Rapid and near-complete dissolution of wood lignin at ≤80° C by a recyclable acid hydrotrope," Sep. 15, 2017, 11 pages.
Chen et al., "GVL pulping facilitates nanocellulose production from woody biomass," Sep. 2, 2019, 10 pages.
He et al., "Fractionation of Poplar Wood Using a Bifunctional Aromatic Acid under Mild Conditions," Apr. 4, 2021, 13 pages.
Li et al., "Comparison of Interfiber Bonding Ability of Different Poplar P-RC Alkaline Peroxide Mechanical Pulp (APMP) Fiber Fractions," BioResources.com, Aug. 2014, 9 pages.
Agarwal e al., "Cellulose Crystallinity of Woods, Wood Pulps, and Agricultural Fibers By FT-Raman Spectroscopy," Jan. 2011, 7 pages.
Sun et al., "Effect of lignin content on changes occurring in poplar cellulose ultrastructure during dilute acid pretreatment," Biotechnology for Biofuels, Oct. 2014, 14 pages.
Majova et al., "Deep Eutectic Solvent Delignification: Impact of Initial Lignin," Aug. 2017, 10 pages.
Meng et al, "Physicochemical Structural Changes of Poplar and Switchgrass during Biomass Pretreatment and Enzymatic Hydrolysis," Jul. 22, 2016, 10 pages.
Buzala et al., "Conversion of various types of lignocellulosic biomass to fermentable sugars using kraft pulping and enzymatic hydrolysis," May 5, 2017, 13 pages.
Pu et al., "Lignin Structural Alterations in Thermochemical Pretreatments with Limited Delignification," Aug. 2, 2015, 14 pages.
Amiri et al., "Establishing lignin structure-upgradeability relationships using quantitative 1H—13C heteronuclear single quantum coherence nuclearmagnetic resonance (HSQC-NMR) spectroscopy," Jul. 15, 2019, 8 pages.
Wang et al., "Preserving Both Lignin and Cellulose Chemical Structures: Flow-Through Acid Hydrotropic Fractionation at Atmospheric Pressure for Complete Wood Valorization," Jun. 18, 2019, 13 pages.
Li et al., "Current Understanding of the Correlation of Lignin Structure with Biomass Recalcitrance," Nov. 18, 2016, 8 pages.
Pan et al., "An uncondensed lignin depolymerized in the solid state and isolated from lignocellulosic biomass: a mechanistic study," Sep. 21, 2018, 13 pages.
Campanelli et al, "Electronegativity, Resonance, and Steric Effects and the Structure of Monosubstituted Benzene Rings: An ab Initio MO Study," Apr. 22, 2003, 12 pages.
Ronchin et al, "Acid catalyzed alkylation of phenols with cyclohexene: Comparison between homogeneous and heterogeneous catalysis, influence of cyclohexyl phenyl ether equilibrium and of the substituent on reaction rate and selectivity," Dec. 16, 2011, 8 pages.
Smith et al., "Cosolvent pretreatment in cellulosic production: effect of tetrahydrofuran-water on lignin structure and dynamics," Oct. 5, 2015, 11 pages.
Motlagh et al, "Screening of Suitable Ionic Liquids as Green Solvents for Extraction of Eicosapentaenoic Acid (EPA) from Microalgae Biomass Using COSMO-RS Model," Feb. 16, 2019, 18 pages.
Berden et al., "High resolution UV spectroscopy of phenol and the hydrogen bonded phenolwater cluster," Jan. 15, 1996, 12 pages.
Buchecker et al, The impact of the structuring of hydrotropes in water on the mesoscale solubilisation of a third hydrophobic component, Nov. 30, 2016, 11 pages.

* cited by examiner

β-aryl ether (β-O-4)   phenylcoumaran (β-5)   resinol (β-β)   cinnamyl alcohol

FRACTIONATION OF WOODY BIOMASS USING PHENOL-4-SULFONIC ACID (PSA)

CROSS-REFERENCE TO RELATED APPLICATION

This application claims the benefit under 35 U.S.C. § 119(e) to U.S. Provisional Patent Application No. 63/191,154, filed May 20, 2021, entitled "FRACTIONATION OF WOODY BIOMASS AT MILD CONDITIONS USING BIFUNCTIONAL PHENOL-R-SULFONIC ACID AS CATALYST AND LIGNIN SOLVENT," which is incorporated herein by reference in its entirety.

FIELD OF THE INVENTION

The present disclosure generally relates to a Fractionation process that produces one or more of cellulose, hemicellulose, and lignin from a wood biomass.

BACKGROUND OF THE INVENTION

Fractionation is a lignocellulose deconstruction process that seeks to utilize the three major components (lignin, cellulose, and hemicellulose). Lignocellulose can be fractionated into lignin, hemicellulose and cellulose with different forms and properties, depending on the species and processing conditions. Fractionation processes may be either cellulose-centred or lignin-first. Cellulose-centred fractionation isolates either: 1) cellulose fibers (e.g. for paperboard and paper production), or 2) structurally deconstructed cellulose fibers for glucose to produce biofuels such as cellulosic ethanol. In contrast, lignin-first fractionation may be utilized to isolate lignin that can be upgraded into monoaromatics.

BRIEF SUMMARY OF THE INVENTION

An aspect of the present disclosure is a cellulose-based fractionation process that can be utilized to fractionate woody biomass such as poplar and birch chips (without the need for size reduction) (e.g. unmilled wood chips) into high-quality cellulose fibres, hemicellulose sugars, and lignin fragments in a manner that provides high yields (e.g. lignin isolation of 90%, 95%, 99%, 100% or nearly 100%) at mild conditions (e.g., about 50-80° C., about 0.5-3 hours, about atmospheric pressure). This process may utilize phenol-4-sulfonic acid (PSA) at a concentration that is sufficient to provide complete or nearly complete fractionation at mild conditions. The phenol-4-sulfonic acid (PSA) may be bifunctional (as a selective catalyst and as a lignin solvent) and lignin-derivable (e.g., the sulfonation of lignin derivable phenol).

Another aspect of the present disclosure is a method of fractionating lignocellulos biomass. The method includes fractionating lignocellulosic biomass in an aqueous phenol sulfonic acid (PSA) having a sufficient weight % of PSA to provide complete or nearly complete fractionation. For example, the aqueous PSA may comprise about 62% to about 100% weight percentage PSA. Various times and temperatures may be utilized during fractionation. For example, fractionation may occur at a temperature of about 50° C. to about 80° C. for about 0.5 hours to about 3.0 hours to form a first mixture comprising fractionated woody biomass and adsorbed PSA. The lignocellulosic biomass may optionally comprise wood chips, which may be unmilled. The lignin isolation % may be at least about 80%, at least about 90% at least about 95%, at least about 99%, or about 100%.

The method may optionally include filtering the first mixture to separate the first solid material from the liquid and form a first filtrate liquid, adding water to the first filtrate to form diluted first filtrate liquid, and filtering the diluted first filtrate liquid to form a second filtrate liquid and a second solid material, wherein the second solid material comprises lignin.

The method may optionally include rinsing the first solid material with alcohol to form a third solid material and an alcohol solution. The method may, optionally, further include bleaching the third solid material to form cellulose.

The method may optionally include adding water to the alcohol solution to form a diluted alcohol solution, filtering the diluted alcohol solution to form a fourth solid material and a third filtrate liquid wherein the fourth solid material comprises lignin.

The method may also, optionally, include causing liquid to evaporate from the second filtrate liquid and the third filtrate liquid to form a sugar-containing material, adding alcohol to the sugar-coating material to form a sugar-containing mixture, mixing the sugar containing mixture with PSA to form solid hemicellulose sugars and a liquid solution, and causing liquid to evaporate from the liquid solution to thereby recover PSA from the liquid solution.

These and other features, advantages, and objects of the present device will be further understood and appreciated by those skilled in the art upon studying the following specification, claims, and appended drawings.

DETAILED DESCRIPTION

For purposes of description herein the terms "upper," "lower," "right," "left," "rear," "front," "vertical," "horizontal," and derivatives thereof do not relate to any specific orientation and it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, times, temperatures, percentages, and other characteristics and descriptions relating to the embodiments disclosed herein are not to be considered as limiting, unless the claims expressly state otherwise.

Figure 1:
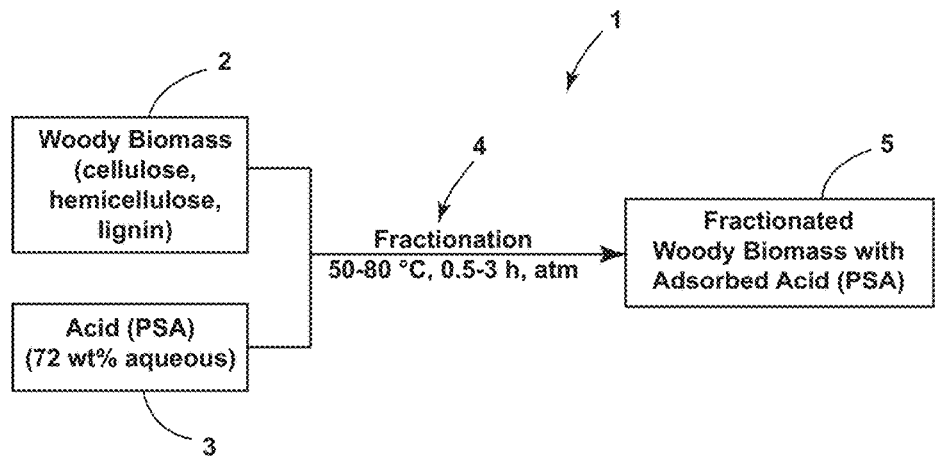
FIG. 1 is a flow chart showing a fractionation process of woody biomass according to an aspect of the present disclosure.
Figure 2:
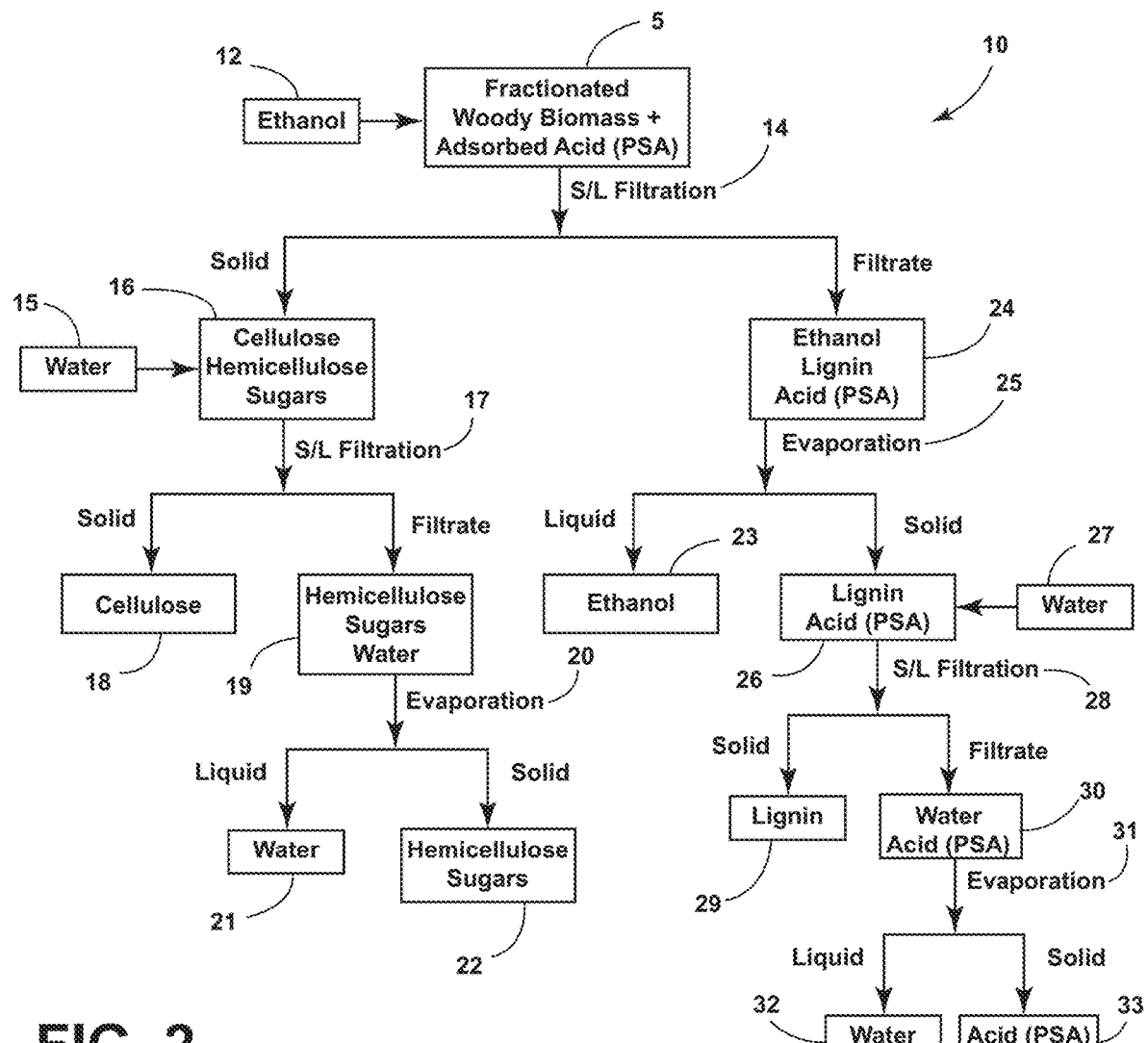
FIG. 2 is a flow chart showing solubility-based separation and purification of lignin, cellulose, hemicellulose sugars, and acid, and recycling of solvents (e.g. water and ethanol) according to another aspect of the present disclosure.

An overview of a process according to an aspect of the present disclosure is shown in FIGS. 1 and 2, and a more detailed description is provided below in connection with FIGS. 3-53.

Figure 11:
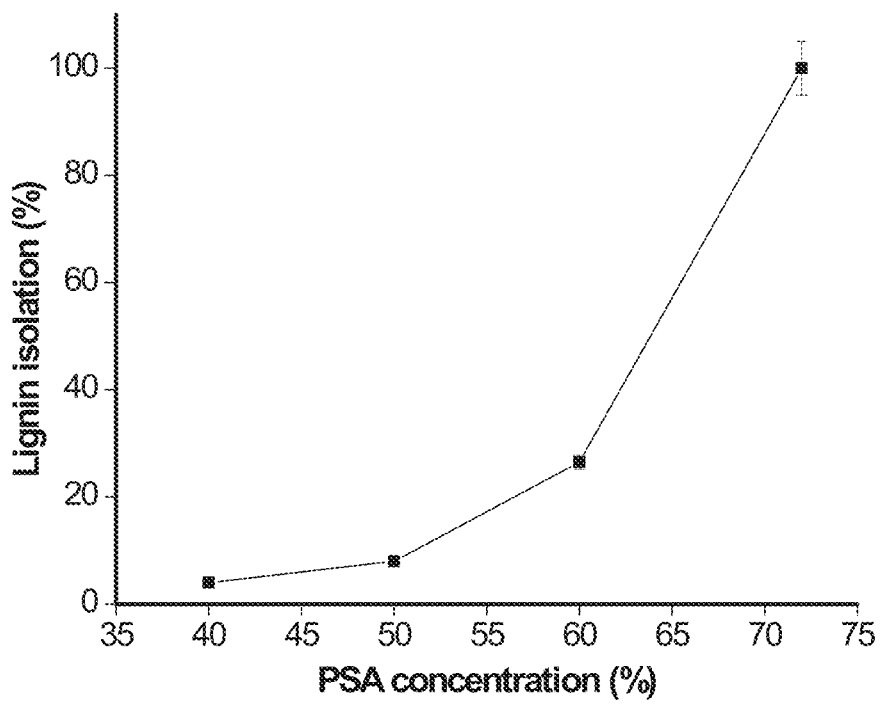
FIG. 11 is a graph showing the effects of PSA concentration on lignin isolation.

With reference to FIG. 1, a process 1 according an aspect of the present disclosure includes combining a woody biomass 2 (e.g. unmilled wood chips) with an aqueous phenol-4-sulfonic acid (PSA) 3. Unmilled wood chips may be formed by directly cutting or chipping larger pieces of wood without a further mechanical milling process using a miller such as Wiley mill, hammer mill, knife mill, disc mill, ball mill, or the like. Unmilled wood chips are typically about 0.098-1.18 inches (length)×0.079-0.79 inches (width)×0.04-0.24 inches (thickness). However, it will be understood that these are merely typical sizes of unmilled wood chips, and unmilled chips may have dimensions outside of these typical ranges. Although the present invention is not limited to any specific weight percentage of acid, the PSA may have a weight percentage of acid of about 72%. Fractionation 4 is then conducted by maintaining the woody biomass 2 and PSA 3 at a temperature of about 50° C. to about 80° C. for about 0.5 hours to about 3.0 hours. Fractionation 4 may occur at atmospheric pressure. Fractionation 4 results in a mixture 5 comprising fractionated woody biomass with adsorbed acid. As shown in FIG. 11, the lignin isolation % may be 100% or close to 100% (e.g. about 90%, at least about 95%, at least about 99%, etc.). The aqueous PSA weight percentage may be at least about 60% or at least about 62% or within ranges of, for example, 70%-74%, 68%-78%, 62%-82%, 52%-92%, about 62%-100% or the weight percentage of PSA may be above or below these exemplary ranges. In general, the weight percentage of PSA may be selected to provide adequate fractionation as required for a specific application, depending on the type and form of the woody biomass, the fractionation temperature, fractionation time, and other factors. For example, with reference to FIG. 11, the PSA weight concentration for a given time and temperature can be selected to provide the desired lignin isolation %. In general, PSA weight concentrations of 72% or higher may provide 100% or close to 100% lignin isolation (e.g. 99% or greater lignin isolation). Although a process providing a high lignin isolation % is preferred, it is not required, and lower PSA concentrations may be utilized.

With further reference to FIG. 2, additional process steps 10 may then be performed on the mixture 5 (fractionated woody biomass and adsorbed acid). Specifically, ethanol 12 may be added to the mixture 5, and solid/liquid filtration 14 may then be utilized to separate solid 16 and filtrate 24. Solid 16 may comprise cellulose and hemicellulose sugars. Water 15 may be added to the solid 16, and solid/liquid filtration 17 may then be used to separate the resulting mixture of water 15 and solid 16 into solid cellulose 18, and filtrate 19. Filtrate 19 comprises hemicellulose sugars and water. Evaporation 20 is then conducted on filtrate 19 to separate liquid water 21 from solid hemicellulose sugars 22.

Filtrate 24 resulting from solid/liquid filtration 14 comprises ethanol, lignin, and acid (PSA). Filtrate 24 is then evaporated as shown at 25 to form liquid ethanol 25, and solid lignin and acid (PSA) 26. Water 27 is then added to the solid 26, and solid/liquid filtration 28 is then conducted to form solid lignin 29 and filtrate 30 comprising water and acid (PSA). Evaporation 31 of water and acid filtrate 30 results in liquid of water 32 and solid acid (PSA) 33.

The following is a more detailed description of a process according to one or more of FIGS. 3-53 according to other aspects of the present disclosure.

Materials

Phenol-4-sulfonic acid (PSA, water: about 10%, sulfate ≤2%), acetic anhydride (≥99%), pyridine (≥99%), ethanol (200 proof), tetrahydrofuran (anhydrous), dioxane (≥99%), dimethyl sulfoxided6 (about 99.9 atom % D), cupriethylenediamine hydroxide (about 0.5 M), sodium hydroxide (pellets, ≥98%), hydrogen peroxide (about 30%), xylose (≥99%), mannose (≥99%), arabinose (≥99%), galactose (≥99%), and rhamnose (≥99%) were purchased from TCI AMERICA. Cellulolytic enzyme (CTec2) was purchased from Sigma-Aldrich. All chemicals were used as received. Fast growing poplar (about 2-3 years), birch and pine were harvested in the Michigan Area. Poplar has a 26.1% lignin, about 42.5% glucose and about 20.9% hemicellulose (xylose: about 17.3%, arabinose: about 0.6%, mannose: about 2.5%, galactose: about 0.5%). Poplar, birch, and pine were chopped to woodchips of approximately 0.25-3 cm (length)×approximately 0.2-2 cm (width)×approximately 0.1-0.6 cm (thickness). These chips were soaked in deionized water for about 24 hours at room temperature. Technical lignin (Mw=3505) was isolated from poplar using an organosols fractionation (see, e.g. Q. Yang and X. J. Pan, *Biotechnol. Bioeng.*, 2016, 113, 1213— 1224).

Chemical Component Analysis

Chemical components (carbohydrates and lignin) of both woodchips and cellulose fibres were analysed using NREL/TP-510-42618. Monomeric sugars were measured using a high-performance liquid chromatograph (HPLC, Agilent Technologies 1260 Infinity) equipped with a Hi-Plex column (7.7×300 mm) and UV and refractive index detectors.

Isolation of Untreated Lignin from Poplar

Cellulolytic enzyme lignin (i.e., untreated lignin) was isolated from untreated poplar. Poplar was milled using a Retsch planetary ball mill PM 100 with stainless steel jar at about 600 rpm for 2 hours. The ball-milled poplar sample was treated with cellulolytic enzyme (CTec2, pH=about 5) at about 50° C. for about 72 hours. The residual solid after the enzymatic hydrolysis was extracted with dioxane (about 96%) for about 48 hours. The extracted lignin was recovered after dioxane was evaporated.

Fractionation of Poplar by PSA

Figure 3:
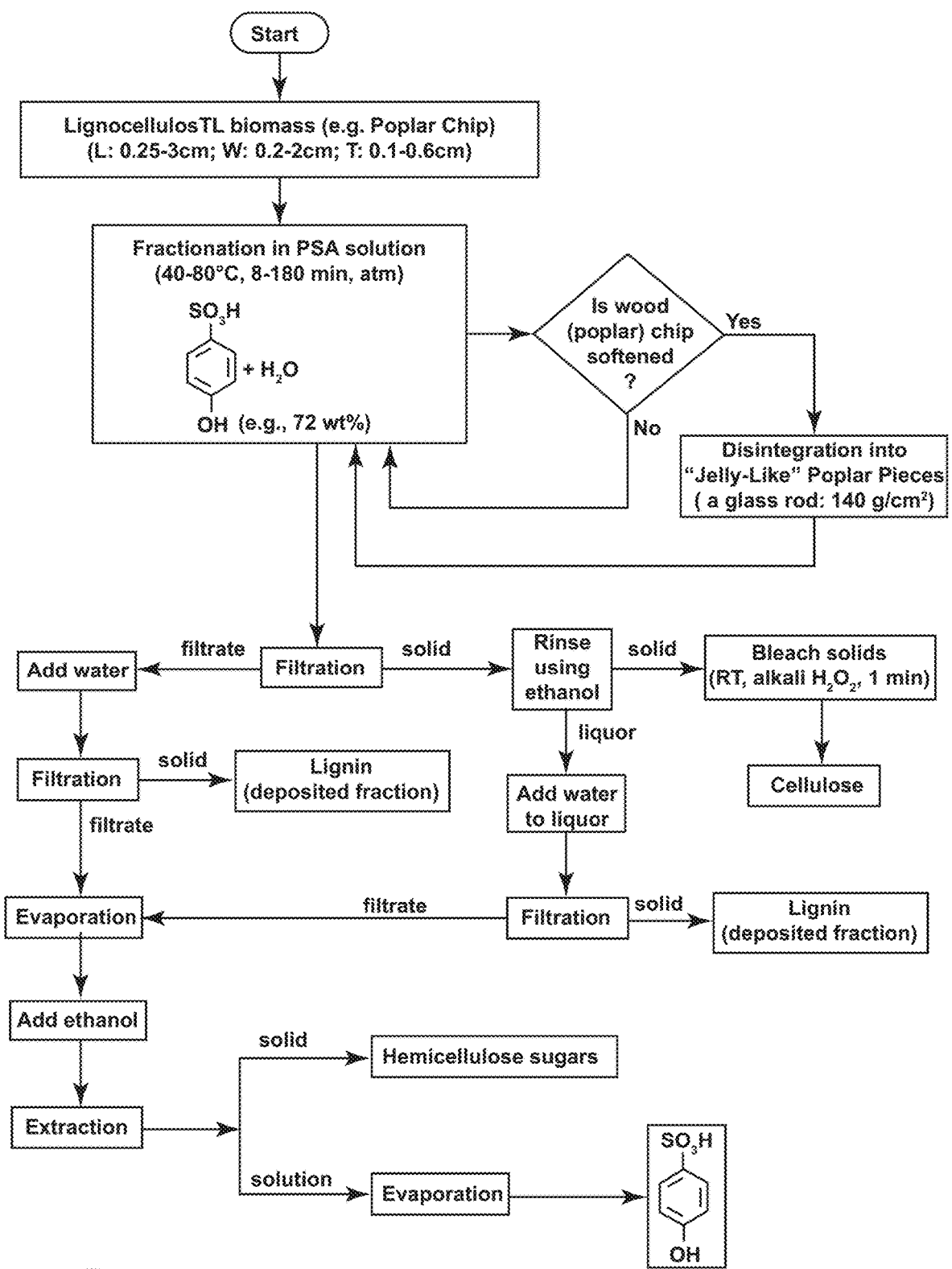
FIG. 3 is a flow chart showing poplar chip fractionation using phenol-4-sulfonic acid (PSA)

Typically, water-soaked poplar chips (about 0.4 g, about 40-about 60% moisture) were incubated with the concentrated aqueous PSA solution (about 50-about 72%) without stirring in a 10 mL (nominal) plastic tube. The fractionation tests were carried out at about 40—about 80° C. for about 1.5 minutes-about 240 minutes. After the chips were softened, they were manually disintegrated using a glass rod for at least about 30 seconds, producing jelly-like pieces. After fractionation, the mixture was centrifugated. The solubilized lignin in the aqueous PSA solution (i.e., the solubilized lignin fraction) was precipitated after an excess amount (about 20 mL) of water was added. Cellulose was obtained as the solid fraction and washed using ethanol about 2-3 times. The ethanol solution containing lignin was collected, and the lignin (named as the deposited lignin fraction) was recovered through the precipitation method by adding an excess amount of water. The recoveries of hemicellulose sugars and spent PSA are shown in FIG. 3.

Critical Aggregation Concentration of PSA

Critical aggregation concentrations of PSA at different temperatures (about 25° C. and about 60° C.) were determined by measuring the conductivities of various concentrations (about 2-about 70%) of the aqueous PSA solutions.

Mesoscale Solubilization of Lignin by PSA

Technical lignin (Mw=3505) was added to the 2 mL (nominal) aqueous 72% PSA solution until no more lignin was dissolved. The obtained solution was centrifugated to remove undissolved lignin. The amount of solubilized lignin was calculated based on the difference between added lignin and undissolved lignin.

Size-Exclusion Chromatography Analysis of Lignin

Size-exclusion chromatography analysis was conducted to measure the molecular weights of lignin samples. Prior to the analysis, lignin samples (~2 mg) were acetylated in about 5 mL of acetic anhydride/pyridine (1:1, v/v) in a dark environment for about 24 hours. Acetylated lignin samples were recovered using a rotary evaporator followed by ethanol washing. The analysis was conducted using a Waters 1525 HPLC equipped with three Waters Styragel columns (HR0.5, HR3 and HR4). Tetrahydrofuran was used as a mobile phase, and calibration was conducted with polystyrene standards.

Nuclear Magnetic Resonance Analysis of Lignin

Two-dimensional (2D) $^{13}C$-$^{1}H$ heteronuclear single quantum coherence (HSQC) nuclear magnetic resonance (NMR) analysis was conducted to understand the structural properties (composition and interunit linkage contents) of each lignin sample. About 30 mg of sample was dissolved in the NMR solvent (DMSO-$d_6$, about 0.5 mL) and loaded to the 5 mm (nominal) NMR tube. Bruker AVANCE III HD 800 MHz spectrometer equipped with TCI cryoprobe was used with a standard Bruker heteronuclear single quantum coherence pulse sequence (hsqcetgpspsi2.2). The NMR operation parameters were 12 ppm spectral width in F2 ($^{1}H$) dimension with 1024 data points and 160 ppm spectral width in F1 ($^{13}C$) dimension with 512 data points, a 1.2 s pulse delay, and 32 scans. The relative abundance of lignin interunit linkage and monomer compositions were calculated by using volume integration of contours in the HSQC spectra (e.g., $C_\alpha$, $S_{2/6}$, $G_2$) semiquantitatively, as described in a previous study.

X-Ray Diffraction Analysis of Cellulose

XRD of cellulose samples was measured using a Bruker AXS D8 Advance X-ray diffractometer (Germany) with a 2.2 kW Cu Kα radiation source energized at 45 kV. Measurements were collected in the 2θ range from 10° to 30° at a rate of 2° min$^{-1}$. Measurement resolution was 0.02°. Then, the results were analyzed using TOPAS software. Crystallinity index (CrI) was calculated using the Segal equation:

$$CrI = \frac{I_{200} - I_{min}}{I_{200}} \times 100 \qquad (1.0)$$

Degree of Polymerization of Cellulose

Intrinsic viscosities (η) of cellulose samples were measured with an Ubbelohde viscometer using 0.5 M cupriethylenediamine hydroxide as a solvent at 20° C. according to the ASTM D1795 method. Degree of polymerization (DPv) was calculated by using the Mark-Houwink equation:33

$$DP_v^{0.905} = 0.75[\eta] \qquad (2.0)$$

Fractionation of Poplar Under Varied Experimental Conditions

Figure 4:
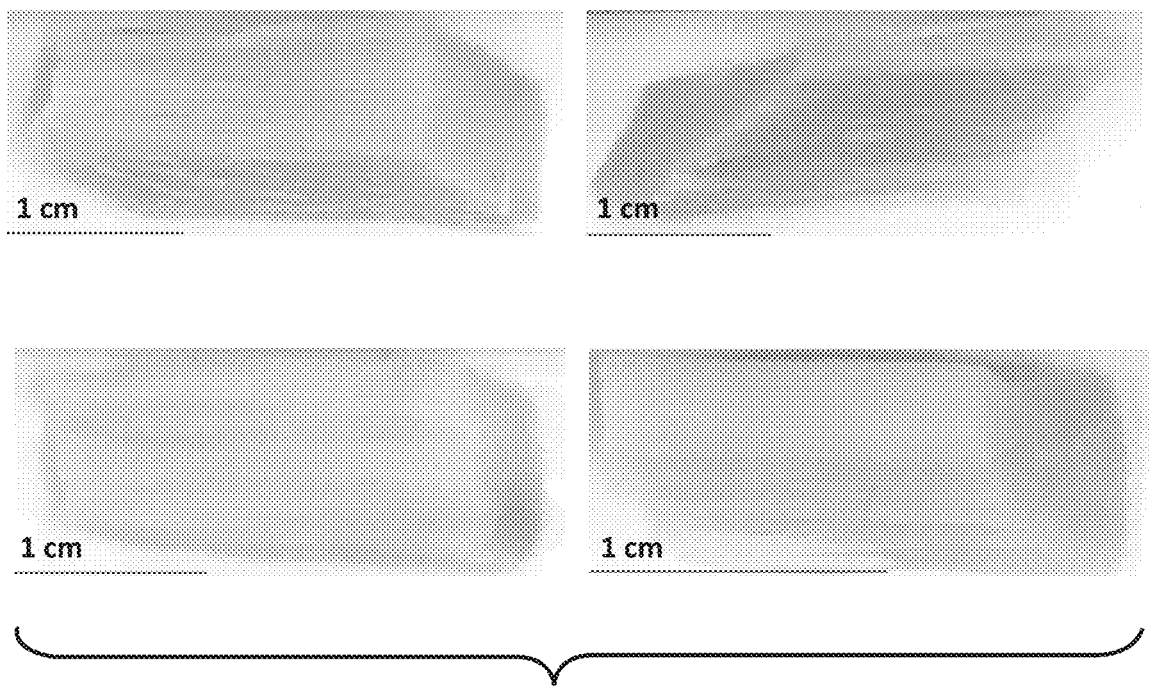
FIG. 4 comprises photos of poplar chips.
Figure 5:
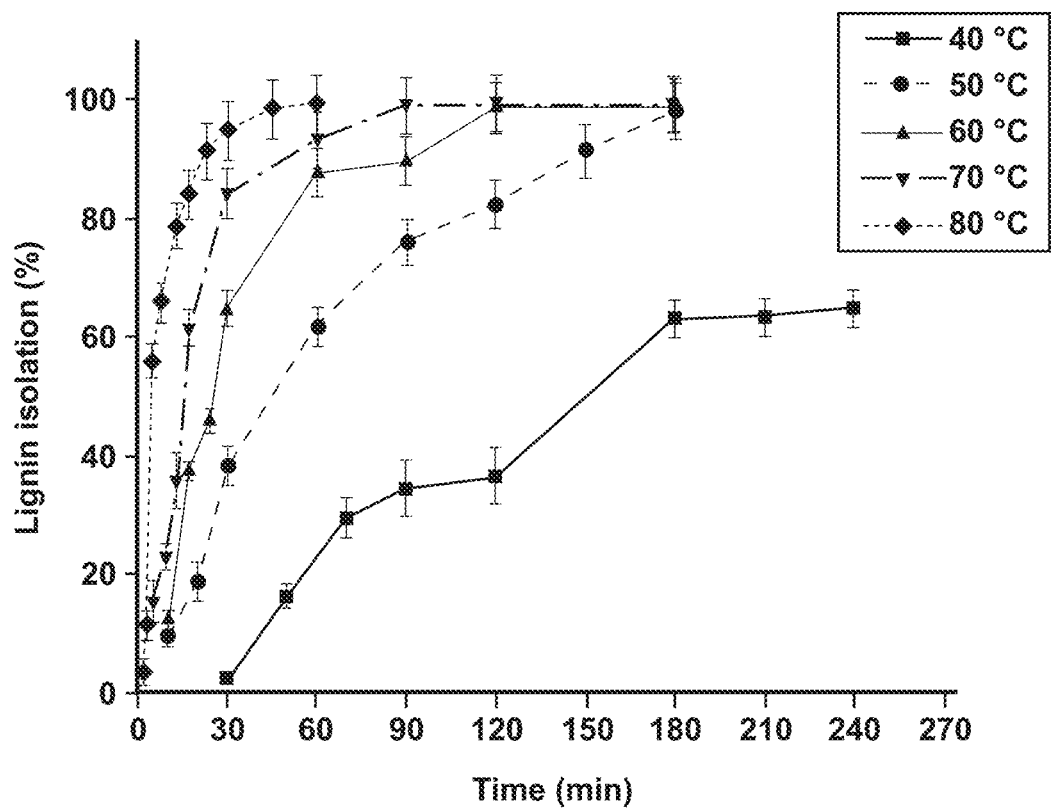
FIG. 5 is a graph showing lignin isolation during fractionation of poplar chips under varied experimental conditions.
Figure 6:
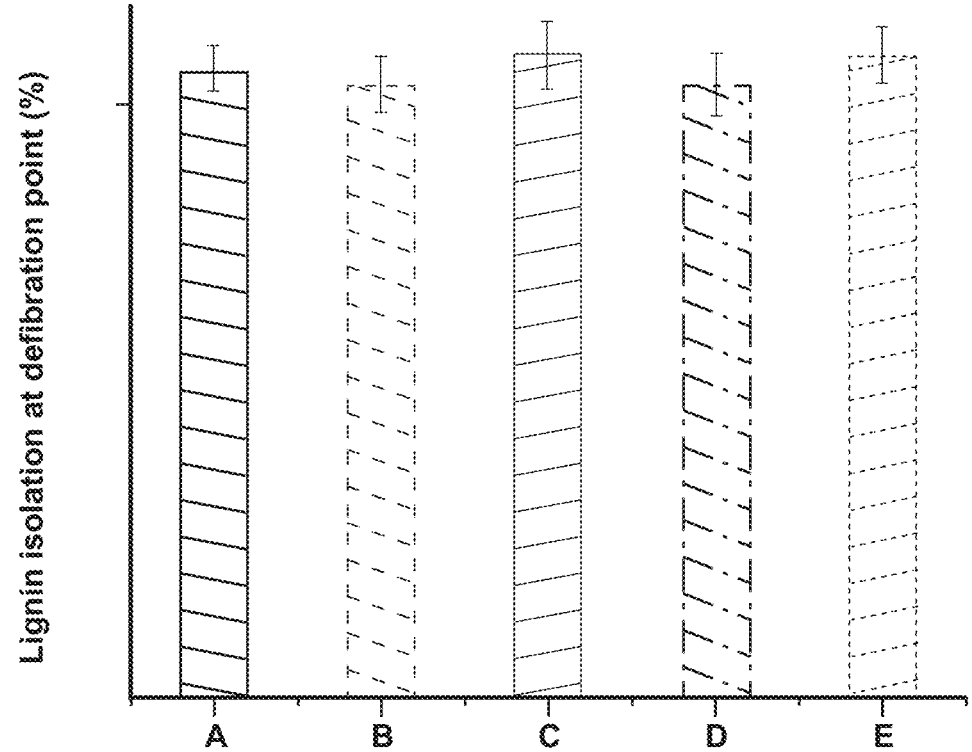
FIG. 6 is a chart showing lignin isolation at the defibration point (A: about 40° C., about 180 minutes; B: about 50° C., about 60 minutes; C: about 60° C., about 30 minutes; D: about 70° C., about 17 minutes; and E: about 80° C., about 8 minutes)

The fractionation of lignocellulosic (woody) biomass (e.g., poplar chip) by PSA (phenol sulfonic acid) is schematically illustrated in FIG. 3. In this example, the typical size of poplar chips was about 1-2.5 cm in length, about 0.8-1.5 cm in width and about 0.3-0.6 cm in thickness (FIG. 4). During fractionation, hemicellulose and lignin are depolymerized, while cellulose remains as fibres.

Accordingly, cellulose fibres, lignin (dissolved and deposited fractions) and hemicellulose sugars are expected after fractionation. The dissolved lignin is directly obtained from the spent PSA solution through precipitation in water, while the deposited lignin is obtained by precipitation from the ethanol solution collected from washing cellulose fibres with ethanol. Hemicellulose sugars are obtained after the spent PSA is recycled.

Figure 7:
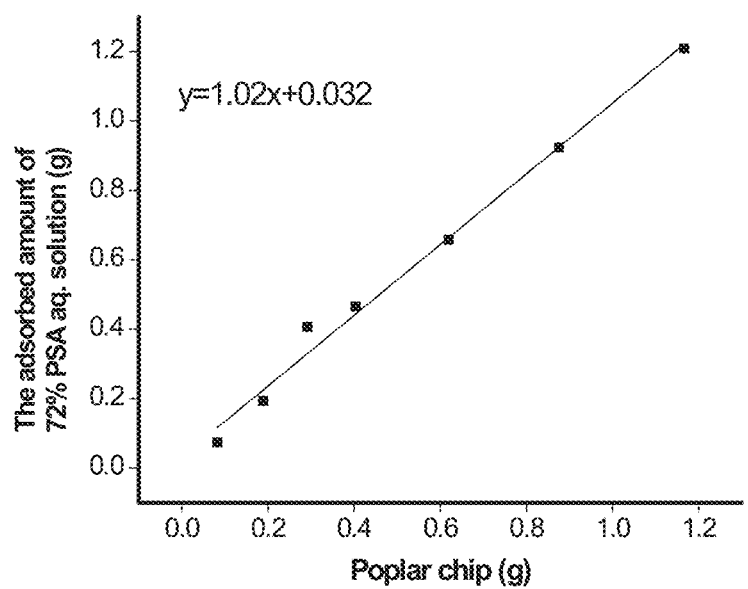
FIG. 7 is a graph showing the correlation between the absorbed amount of the aqueous PSA solution (e.g. 72%) and poplar chip weight.

A good uptake of the aqueous PSA solution (e.g. 72% PSA) by poplar chips is crucial to effective subsequent fractionation. The results in FIG. 7 show that the poplar chips may adsorb as much as its equivalent weight of the aqueous 72% PSA solution at 25° C. Fractionation experiments using the aqueous 72% PSA solution were conducted under varied conditions (about 40-about 80° C. and about 1.5-about 240 min), with the results shown in FIGS. 5 and 6.

Figure 8:
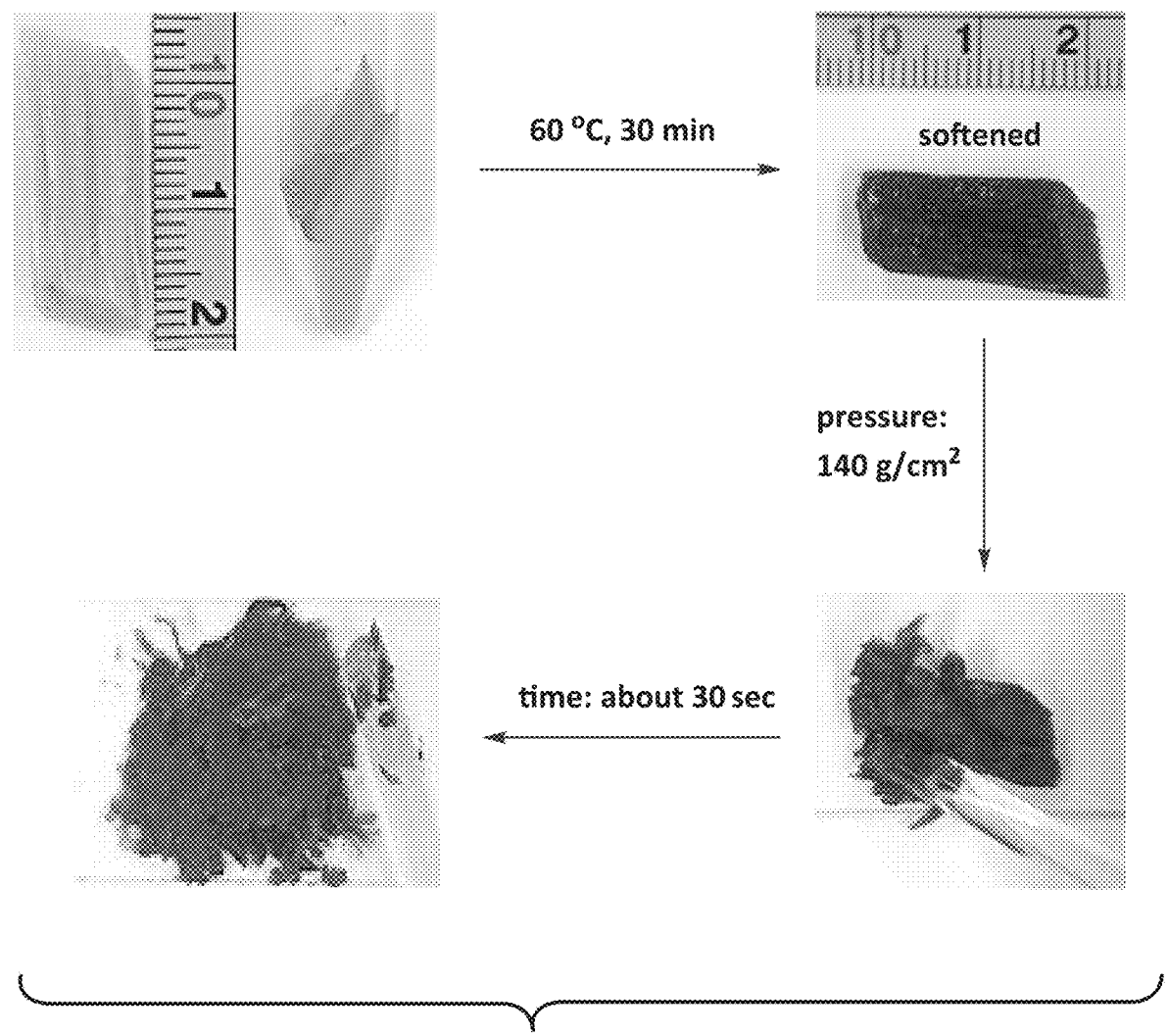
FIG. 8 are images showing integration of softened poplar chip using a glass rod.

The lignin fractionation performance of the aqueous 72% PSA solution was influenced by temperature and time. At each tested temperature, it was observed that the poplar chips were softened ("defibration point") after about 62-65% lignin (the sum of dissolved and deposited fractions) was released. Without wishing to be bound by a specific explanation, the observed softening phenomenon may be attributed to the isolation of lignin in the middle lamellae that hold the plant cell walls together. To facilitate the lignin isolation and fractionation, the softened poplar chips were manually disintegrated using a glass rod (end area: 0.7854 cm$^2$) with a pressure of about 140 g cm$^{-2}$ for around 30 seconds into jelly-like pieces (FIG. 8). After disintegration, the near-complete isolation of lignin and subsequent fractionation was achieved under several conditions, including about 80° C. for about 30 minutes, about 70° C. for about 90 minutes, about 60° C. for about 120 minutes, and about 50° C. for about 180 minutes. The disintegrated poplar pieces have smaller sizes, which may be beneficial to lignin isolation. In contrast, at about 60° C. for about 120 minutes, without the disintegration after the defibration point, the total lignin isolation was about 80%.

Figure 9:
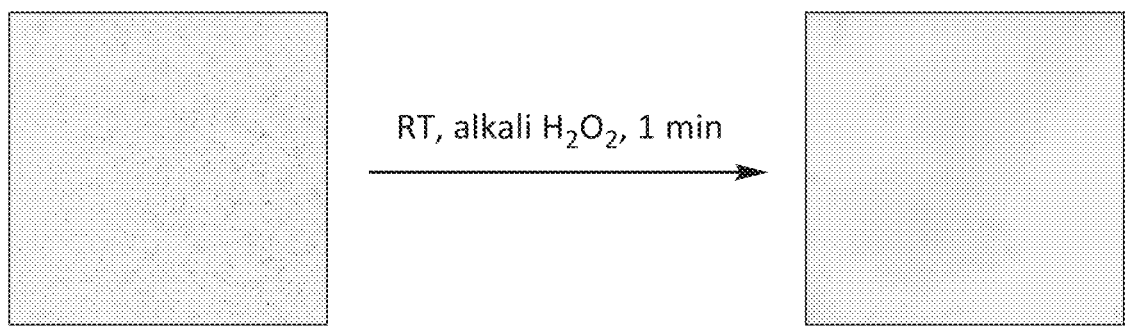
FIG. 9 shows bleaching of cellulose fibres using alkali hydrogen peroxide.

During fractionation, hemicellulose was hydrolysed to monomeric sugars. When the lignin isolation was completed, hemicellulose was also mostly hydrolysed to sugars in theoretical maximum yields, according to the HPLC analysis results. After hemicellulose and lignin were near-completely isolated, cellulose fibres with a creamy-white colour were obtained (FIG. 9).

Figure 10:
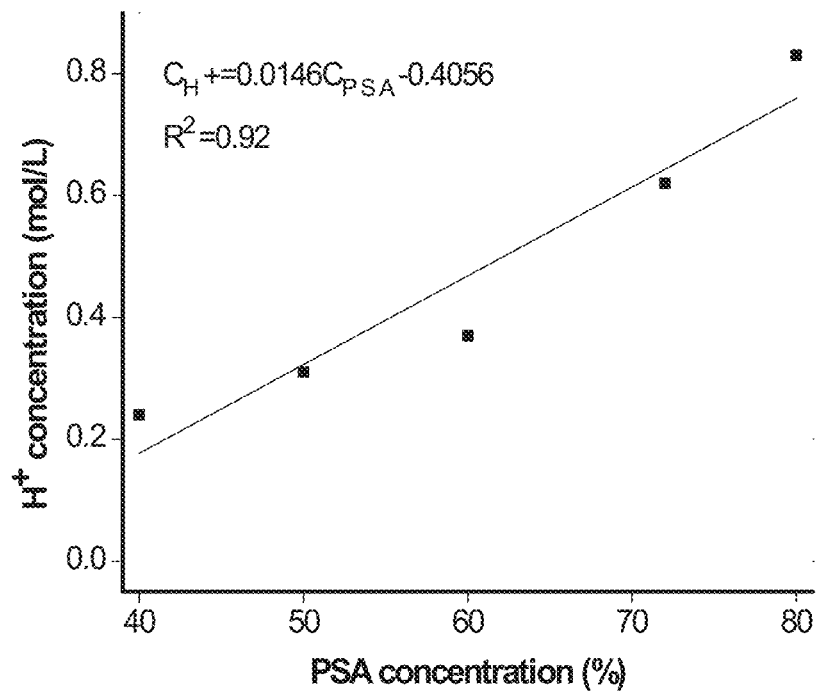
FIG. 10 is a graph showing the effects of PSA concentration on proton concentration.
Figure 12:
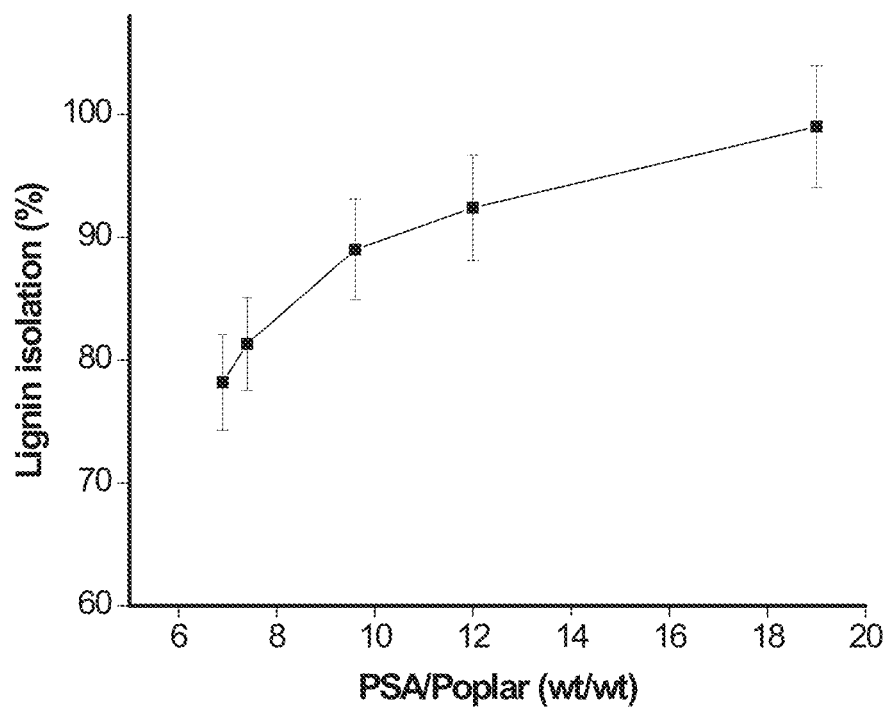
FIG. 12 is a graph showing the effect of PSA/poplar (oven dry) weight ratio on lignin isolation.

The effects of the aqueous concentration (about 40-about 80%) of PSA solution and the weight (oven dry) ratio (about 6.9-about 19) of PSA to poplar chip were also investigated. The measured proton concentration of the aqueous PSA solution linearly decreased from about 0.83 M to about 0.24 M when its concentration decreased from about 80% to about 40% (FIG. 10). Consequently, the lignin isolation performance (4-100%) was greatly influenced by the PSA concentration (FIGS. 10 and 11). For example, the aqueous about 40%-about 60% PSA solution only isolated about 4-26.5% lignin, while the aqueous 72% PSA solution isolated about 100% lignin. These results are believed to be due to the low density (a calculated 5.74 mmol SO$_3$H per g) of the sulfonic acid group in PSA. Structurally, PSA is composed of the phenol and the sulfonic acid group. Functionally, only the sulfonic acid group acts as catalyst, while the phenol contributes to solubilizing lignin fragments during fractionation. The lignin isolation increased from 78% to 99% with the increase of weight ratio of PSA to poplar chip (oven dry) from 6.9 to 19 (FIG. 12).

Figure 13:
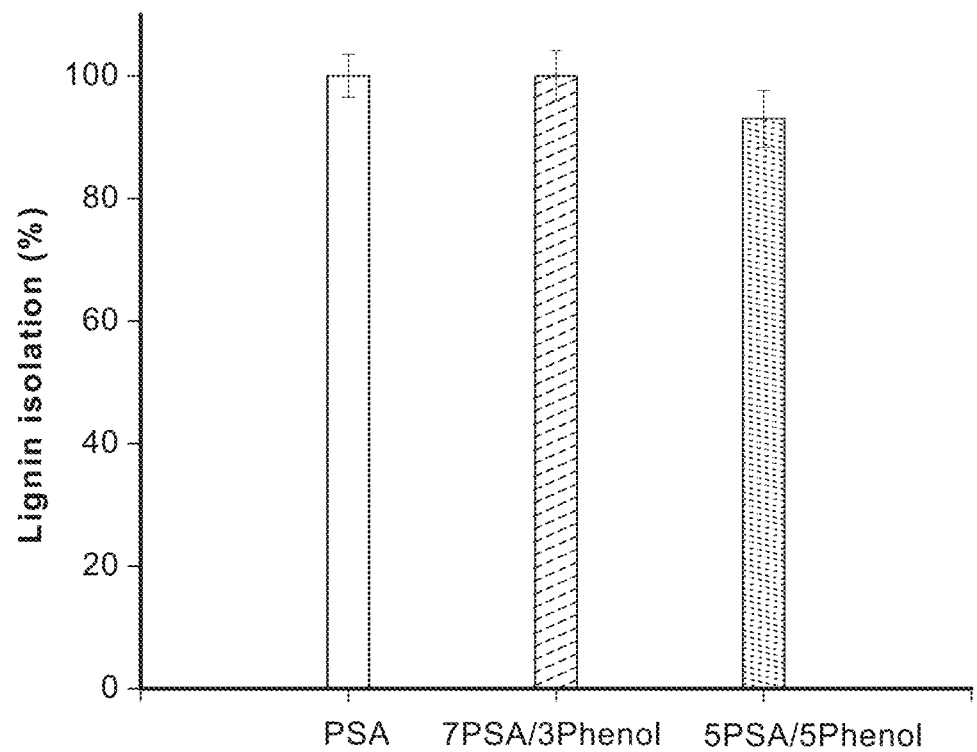
FIG. 13 is a chart showing the effect of PSA/phenol weight ratio on lignin isolation.
Figure 14:
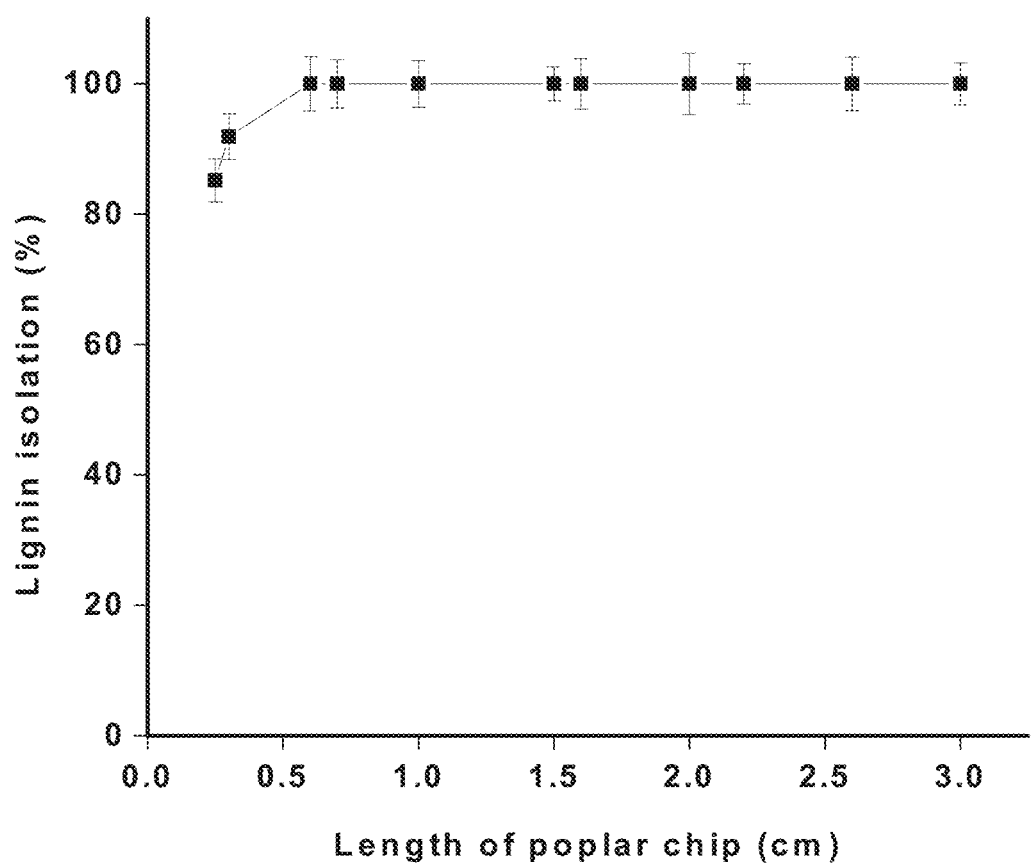
FIG. 14 is a graph showing the effect of the length of poplar chip (width: 1.5 cm, thickness: 0.3 cm) on its lignin isolation by PSA (about 60° C., 2 h, PSA/poplar chip=19)
Figure 15:
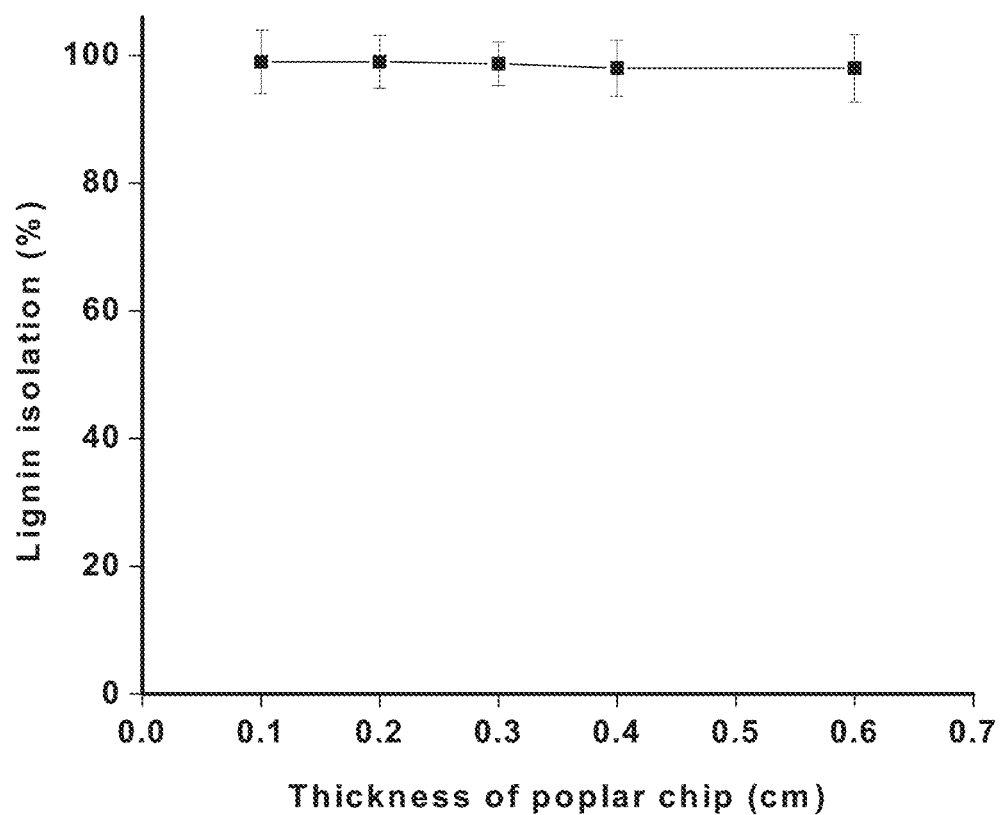
FIG. 15 is a graph showing the effect of the thickness of poplar chip (length: 1.5 cm, width: 1.5 cm) on its lignin isolation by PSA (about 60° C., 2 h, PSA/poplar chip=19)
Figure 16:
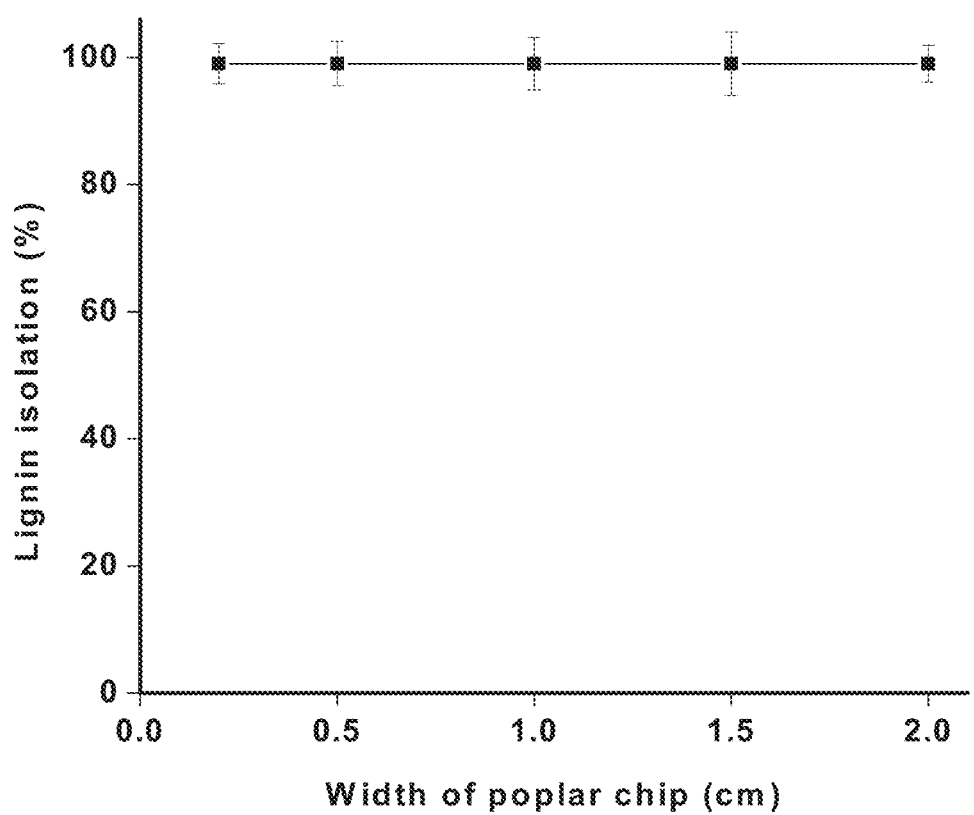
FIG. 16 is a graph showing the effect of the width of poplar chip (length: 1.5 cm, thickness: 0.3 cm) on its lignin isolation by PSA (about 60° C., 2 hours, PSA/poplar chip=19)

To reduce the dosage of PSA, the aqueous 72% PSA solution was partially replaced with phenol. The results show that the aqueous 72% PSA solution can be replaced by phenol up to about 50% without greatly compromising the lignin isolation performance (FIG. 13). The effects of the dimensions (length: about 0.25 cm-about 3 cm, width: about 0.2 cm-about 2 cm, thickness: about 0.1-about 0.6 cm) of the poplar chip on the lignin isolation at 60° C. were also investigated. The results showed that the length, when it was below 0.6 cm, affected the lignin isolation, while the width and thickness did not (FIGS. 13-16). The results may be explained by the fact that the uptake of the aqueous PSA solution by poplar chip may be primarily achieved through longitudinal penetration. Furthermore, the subsequent diffusion of the adsorbed aqueous PSA solution to the lignin sites is believed to be mainly accomplished through the longitudinal direction rather than the tangential and radial directions.

Figure 17:
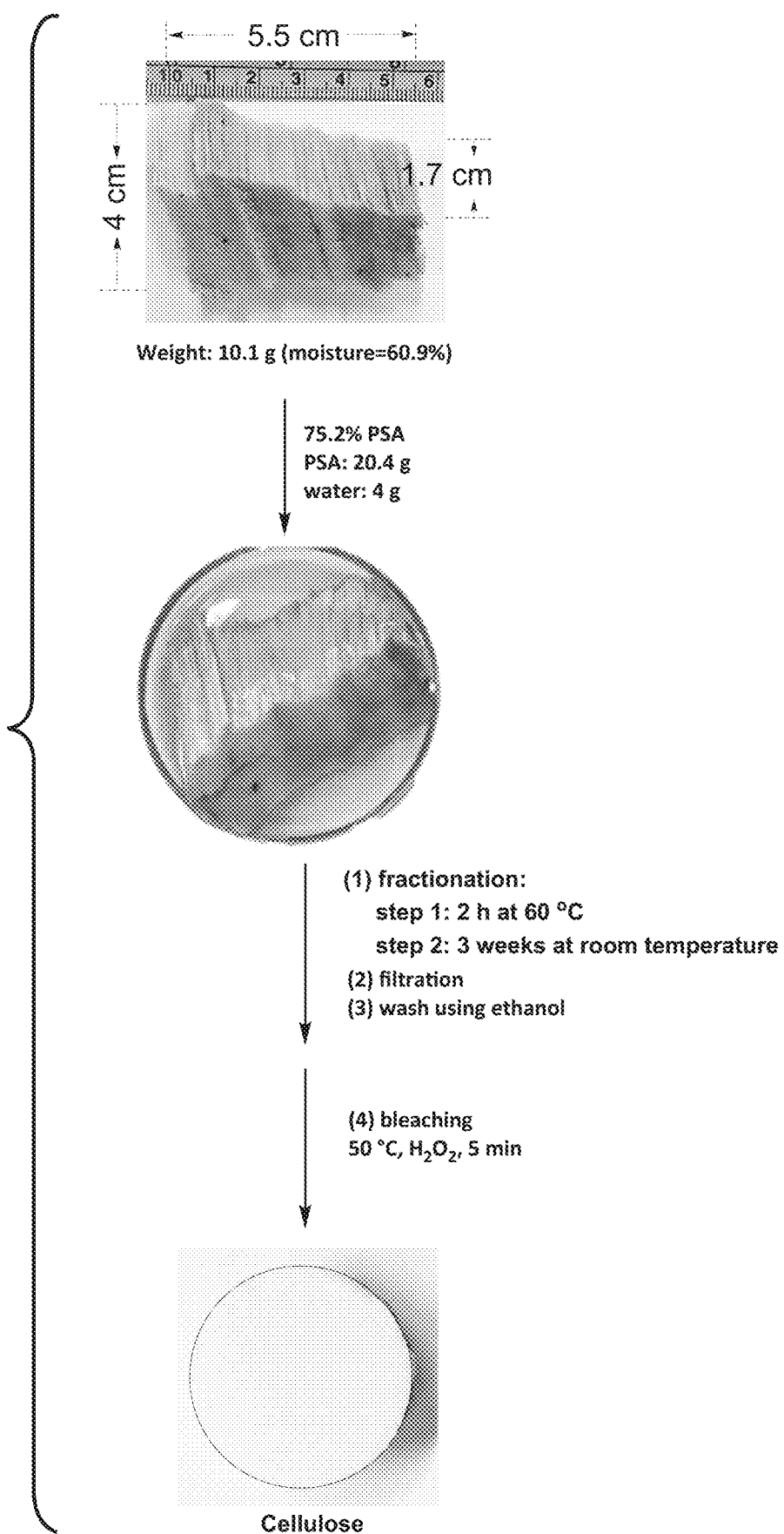
FIG. 17 shows fractionation of a larger poplar chip by PSA.

To see if the aqueous PSA solution can handle larger poplar chips, a poplar chip was tested. The chip was 5.5 cm length, 4 cm width, and 1.7 cm thickness (FIG. 17). After treatment at 60° C. for 2 hours, this chip was not softened. However, after 3 weeks at room temperature, the treated poplar chip was near-completely fractionated. This result indicates that the aqueous 72% PSA solution can perform at room temperature and can likely fractionate larger poplar chips at stronger conditions (e.g., higher temperature and/or longer time).

Figure 18:
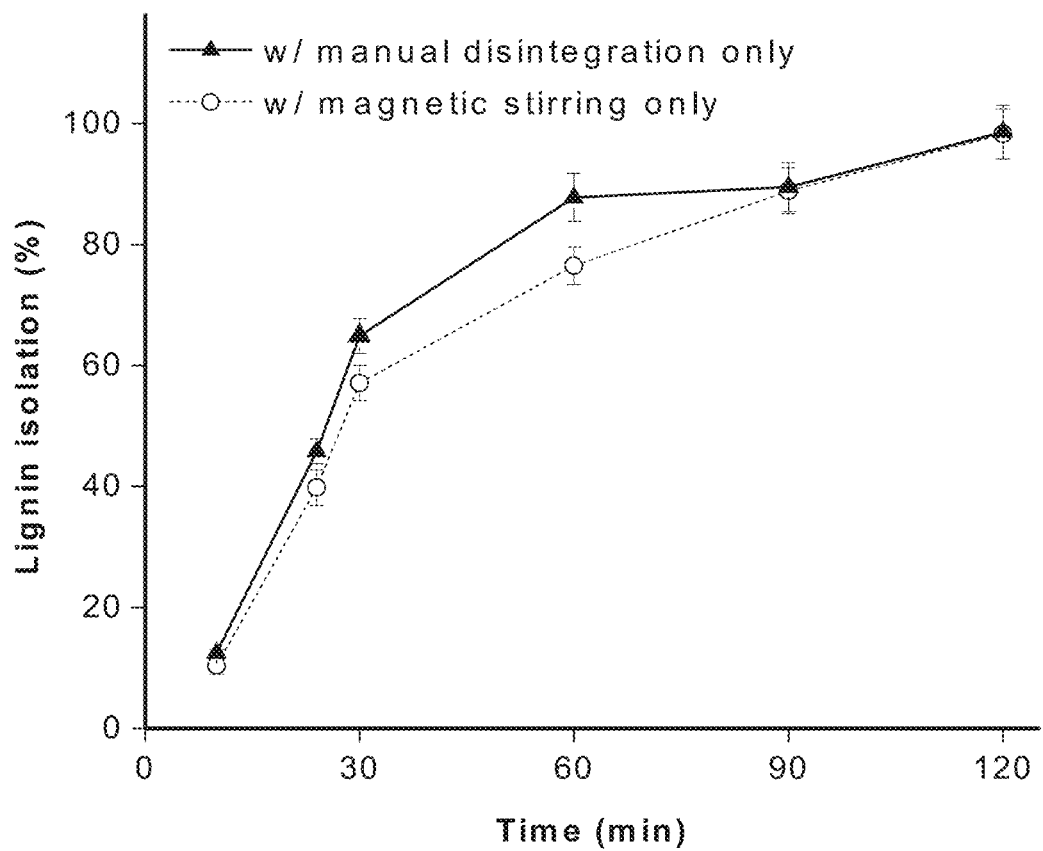
FIG. 18 is a graph showing manual disintegration (at the defibration point) vs magnetic stirring (at 200 rpm) for lignin isolation during fractionation of poplar chip at about 60° C.

The fractionation of the poplar chip at 60° C. under magnetic stirring (200 rpm) was also investigated. The stirring slightly reduced the lignin isolation before 90 minute (FIG. 18). The stirring might influence the mesoscale solubilization of lignin fragments by interfering with the aggregation/clustering behaviours of PSA (see FIG. 51). This result also shows that stirring can eliminate the need for manual disintegration at the defibration point (FIG. 8).

Figure 19:
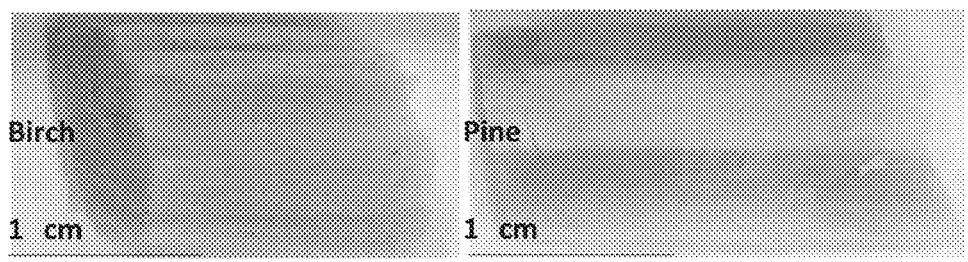
FIG. 19 comprises photos of birch and pine chips.
Figure 20:
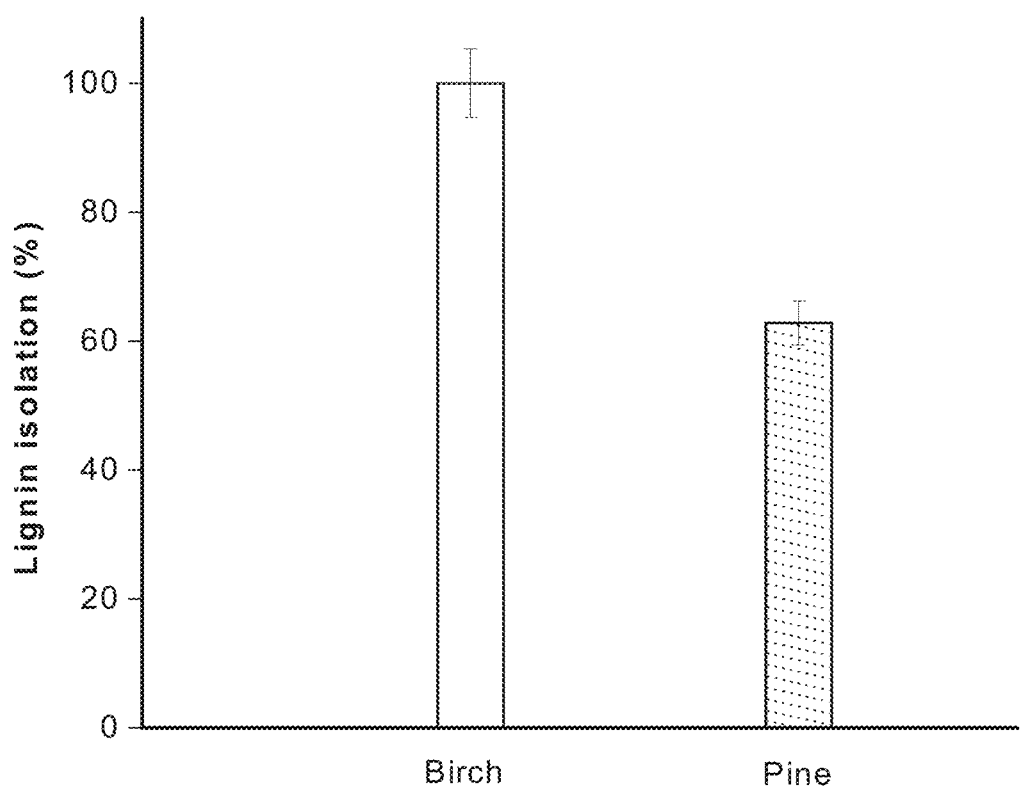
FIG. 20 is a chart showing the lignin isolation of the chips of FIG. 19.
Figure 21:
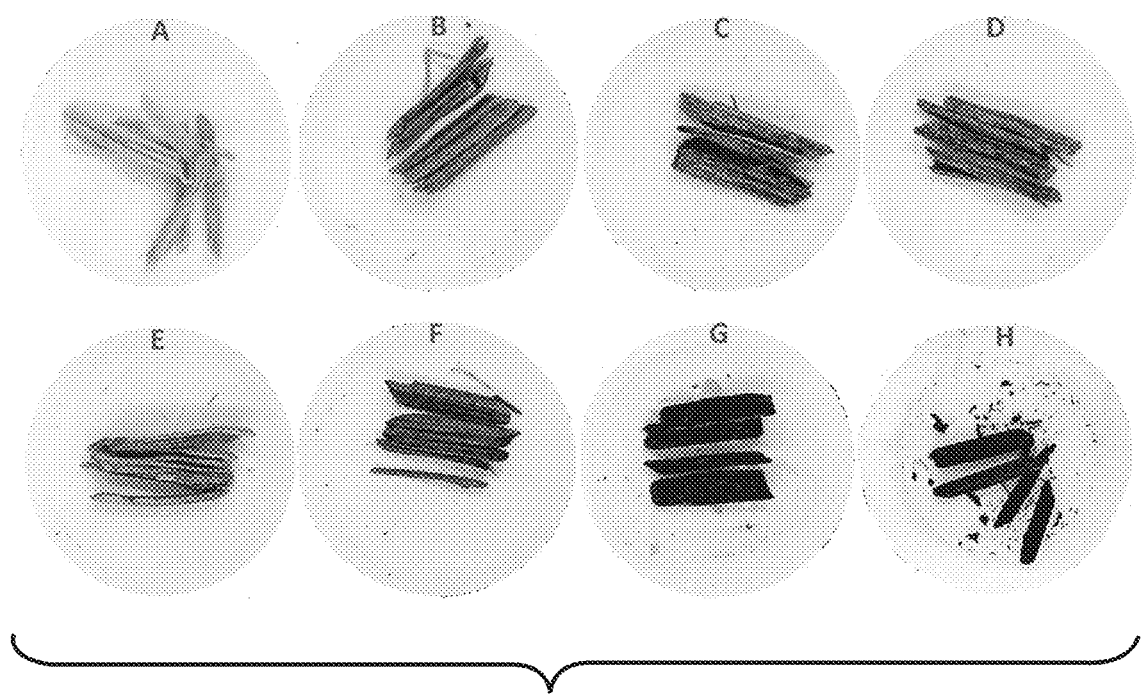
FIG. 21 comprises photos of fractionated poplar slices by sulfuric acid with different concentrations at about 60° C. for 2 hours, wherein A: 0.8M, B: 1.6 M, C: 2.4 M, D: 3.2 M, F: 4.8 M, and G: 5.6 M, H: 72 M.

PSA is adaptable to fractionating other centimetre-sized hardwood. For example, an aqueous 72% PSA solution near completely isolated lignin from birch chips at about 60° C. for 2 hours (FIGS. 19 and 20). However, the aqueous 72% PSA solution was less effective (about 63% lignin isolation) with the centimetre-sized pine chip (softwood) at about 60° C. for about 2 hours. By comparison, sulfuric acid (about 0.8-7.2 M) did not appreciably fractionate the poplar slices at the same conditions (e.g., 60° C. and 2 hours, FIG. 21).

Characterization of Cellulose

Figure 22:
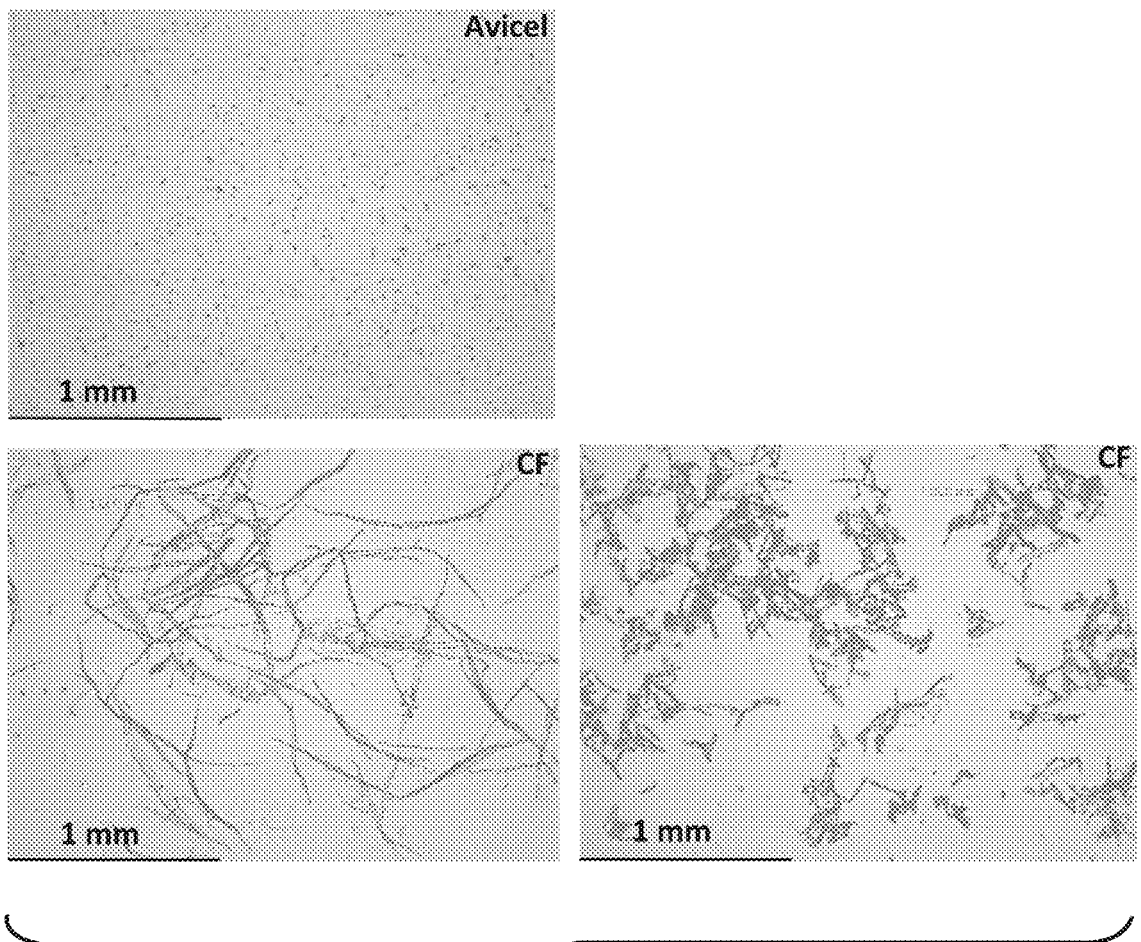
FIG. 22 comprises optical microscope images of microcrystalline cellulose powder (Avicel) and cellulose fibres (CF) after incubated with the aqueous 72% PSA solution at about 60° C. for 2 hours.

At such mild conditions (50-80° C. and 0.5-3 h), it may be expected that the aqueous 72% PSA solution can hydrolyse the amorphous regions of cellulose while maximally preserving the crystalline regions that are well protected by the strong inter- and intramolecular hydrogen bonds. To test if it can depolymerize cellulose to water-soluble oligomers or sugars, the aqueous 72% PSA solution was applied to hydrolyse cellulose powder (Avicel) and commercial fibres at 60° C. for 2 hours. In spite of substantial depolymerizations, cellulose powder and fibre were fully recovered as solids (FIG. 22).

Figure 23:
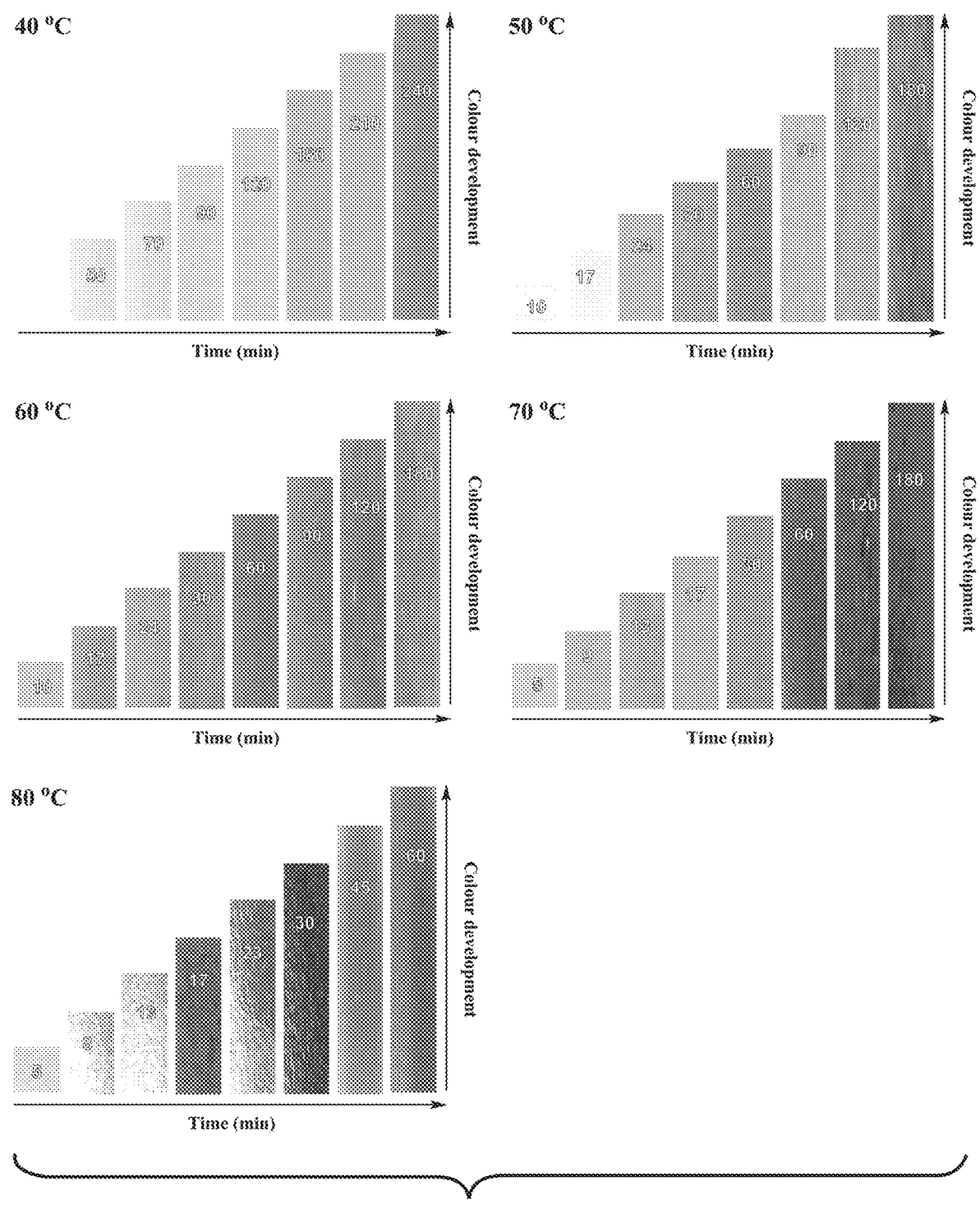
FIG. 23 comprises charts showing colour development of lignin under varied fractionation conditions.

The chemical components, crystallinity indexes, degrees of depolymerization, sizes and morphologies of the unbleached cellulose samples obtained from the aforementioned optimal conditions (about 50° C., about 180 minutes; about 60° C., about 120 minutes; about 70° C., about 90 minutes; about 80° C., about 30 minutes) were analysed (FIG. 3). These cellulose samples showed high purity (about 98% cellulose, about 1.9% hemicellulose and about 0.1% lignin). These cellulose fibres quickly achieved around 86 Elrepho units of brightness after being mildly (room temperature and 1 min) treated with hydrogen peroxide alkaline solution (FIG. 23). Conversely, conventional chemical pulps such as dark brown kraft pulp and light-yellow sulphite pulp may require multi-stage bleaching using chemicals such as hydrogen peroxide and chlorine-containing chemicals. On average, the cellulose fibres are more than 1 mm in length and have a degree of polymerization ($DP_v$) between about 830 and about 887. The crystallinity indexes of these cellulose samples range from about 61 to about 65. These results demonstrate that the cellulose fibres obtained in this study have similar or comparable structural properties to those of commercial hardwood pulps.

Characterization of Lignin

Native lignin is almost colourless in lignocellulose, while the isolated lignin samples, such as alkali, kraft, sulphite and organosols lignin, are typically coloured to different degrees due to the presence of a variety of chromophores (e.g., quinones and quinonoid) introduced through structural alterations during fractionation. For a given fractionation process, the lignin colour was dependent upon the experimental conditions. In the present study, the colour development of lignin during fractionation under varied experimental conditions was visually monitored, and the results are presented in FIG. 23. Apparently, milder conditions such as lower temperatures and/or shorter fractionation time produced brown lignin fragments, but other conditions produced intensively darkened lignin fragments.

To probe their structural properties and molecular weights, the lignin fragments (about 25% dissolved and about 75% deposited fractions) isolated at about 60° C. for about 2 hours (medium conditions) were analysed using 2D HSQC NMR and SEC (FIGS. 36-45 and Tables 1 and 2) and were compared with untreated lignin (i.e. cellulolytic enzyme lignin) in poplar.

TABLE 1

The compositions and inter-unit linkage content values of untreated and isolated (the solubilized and deposited fractions) poplar lignin samples

| Composition (%) | | Untreated | Solubilized | Deposited |
|---|---|---|---|---|
| Syringyl (S) | Total | 69.8 | 77.8 | 71.5 |
| | Condensed | 0 | 49.3 | 60 |
| | Uncondensed | 69.8 | 28.5 | 11.4 |
| Guaiacyl (G) | Total | 30.2 | 22.2 | 28.5 |
| | Condensed | 0 | 20.6 | 28.5 |
| | Uncondensed | 30.2 | 1.6 | 0 |
| p-Hydroxybenzoic acid (PB) | | 14.6 | 0 | 0 |
| S/G ratio | | 2.31 | 3.51 | 2.5 |
| Condensed/uncondensed | | 0 | 2.32 | 7.76 |
| β-O-4 | | 61 | 9 | 3 |
| β-5 | | 3.8 | 2.3 | 1.3 |
| β-β | | 5.1 | 5.8 | 3.3 |

Content is expressed as a fraction of total S and G units.

TABLE 2

The molecular weights of untreated and isolated (the solubilized and deposited fractions) poplar lignin samples

| Sample | $M_w$ (g mol$^{-1}$) | $M_n$ (g mol$^{-1}$) | PDI |
|---|---|---|---|
| Untreated | 13012 | 5267 | 2.47 |
| | 12690 | 5143 | 2.47 |
| Solubilized | 5553 | 2257 | 2.46 |
| | 5356 | 2214 | 2.42 |
| Deposited | 3332 | 1166 | 2.86 |
| | 4024 | 1316 | 3.06 |

The results show that the predominate inter-unit linkages for both dissolved and deposited lignin samples were β-O-4, β-β and β-5. Due to the acid-labile nature of the β-O-4 linkage, the majority (85.3-95.1%) of the β-O-4 linkages in the lignin fragments were removed, which is generally consistent with previous reports on the acid-catalysed fractionation or pretreatment. Similarly, at a near-complete lignin isolation from poplar powder, p-toluenesulfonic acid (TsOH) retained the 7.6-17.3% β-O-4 linkages in lignin. The deposited lignin fraction in the present study has a similar amount (about 5%) of β-O-4 linkages to commercial technical lignin samples, such as alkali and ethanol lignin, while the dissolved lignin fraction has more (14.7% vs. 5%) β-O-4 linkages. In general, PSA may shield the solubilized lignin fragment by separating it from the aqueous acidic environment (see FIG. 51) and may have caused the dissolved lignin fraction to retain more (14.7% vs. 4.9%) β-O-4 linkages.

The acid-catalysed depolymerization of lignin may be accompanied by condensation. Syringyl (S) and guaiacyl (G) units were condensed in both dissolved and deposited fractions. However, possible due to the hypothesized hydrotropic protection, the dissolved lignin fraction showed much less (2.32 vs. 7.76) condensed structures compared with the deposited lignin fraction. Similarly, the solubilized lignin fraction retained more β-5 (2.3 vs. 1.3) and β-β(5.8 vs. 3.3) linkages compared with the deposited lignin fraction. These results collectively suggest that the solubilized lignin fraction may be protected by PSA. Due to the hydrolysable nature of ester linkage, p-hydroxybenzoic acid was completely or substantially removed by PSA from both dissolved and deposited lignin fractions. The S/G ratio increased from about 2.31 to about 3.51 in the solubilized lignin fraction; however, the S/G ratio in the deposited lignin fraction was not significantly changed.

Figure 24:
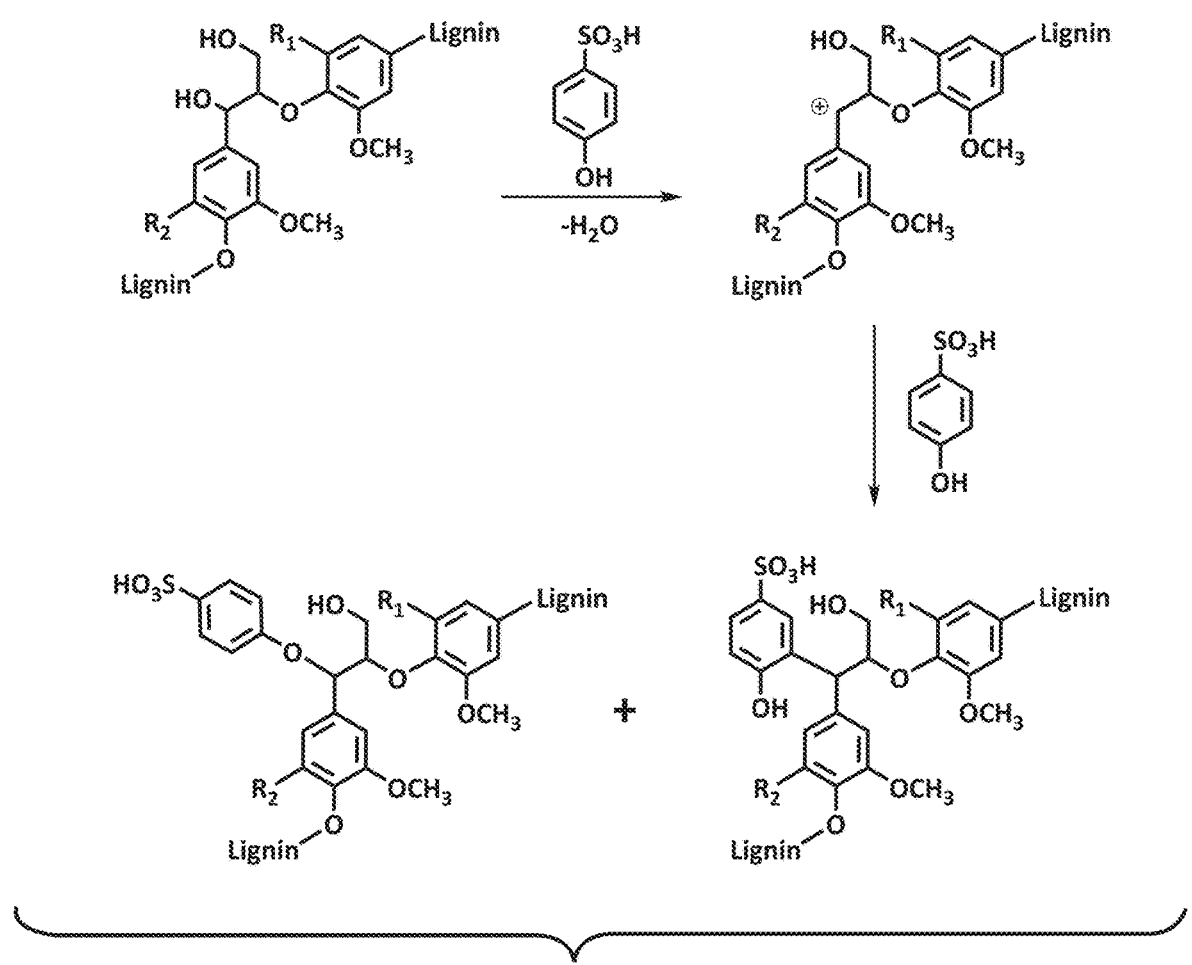
FIG. 24 is a schematic illustration of the reactions of PSA with lignin.
Figure 25:
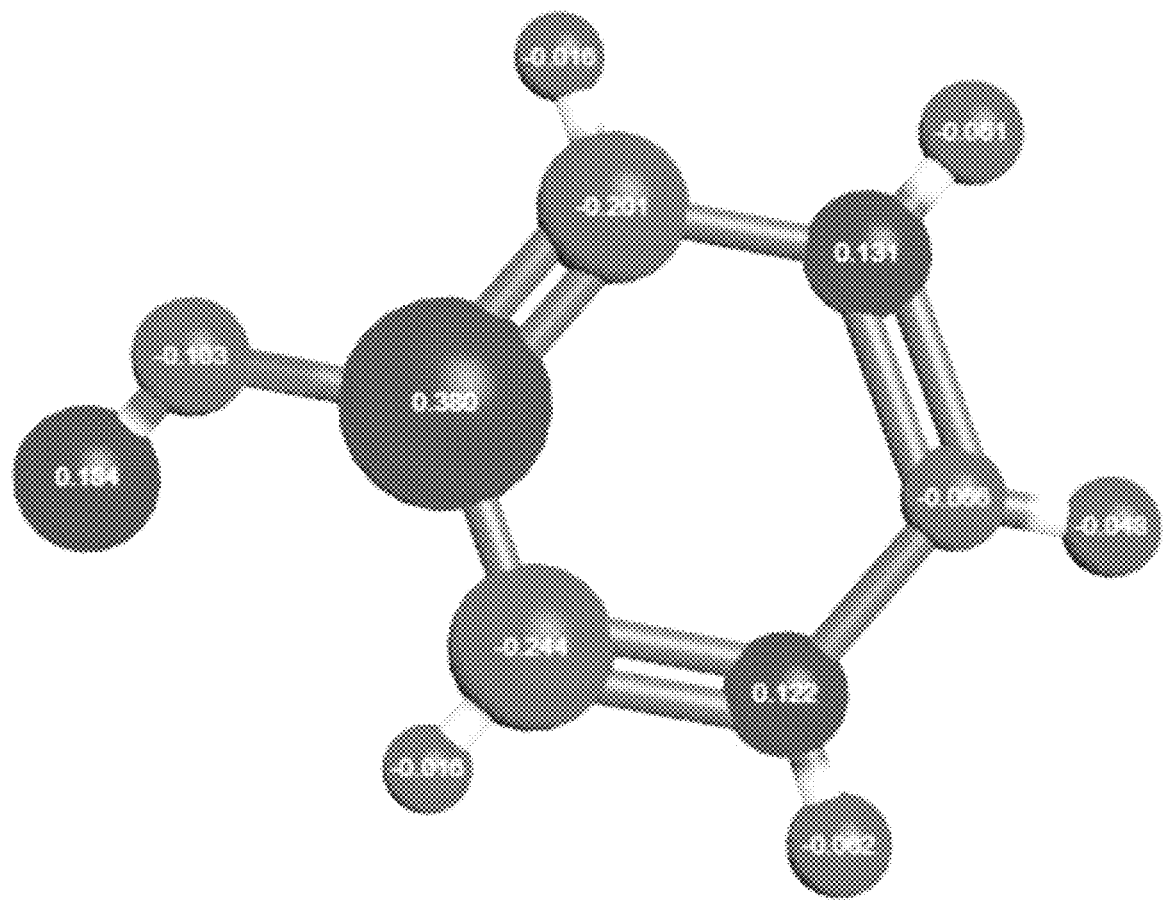
FIG. 25 is a schematic partial charge diagram of phenol.
Figure 26:
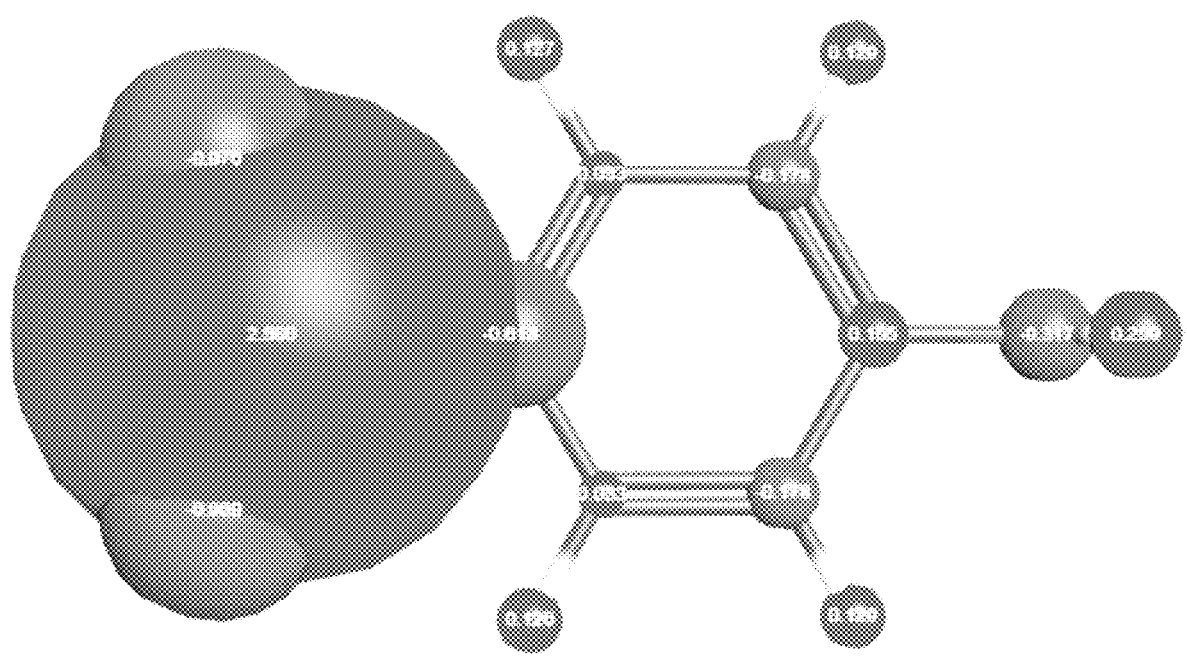
FIG. 26 is a schematic partial charge diagram of PSA.
Figure 27:
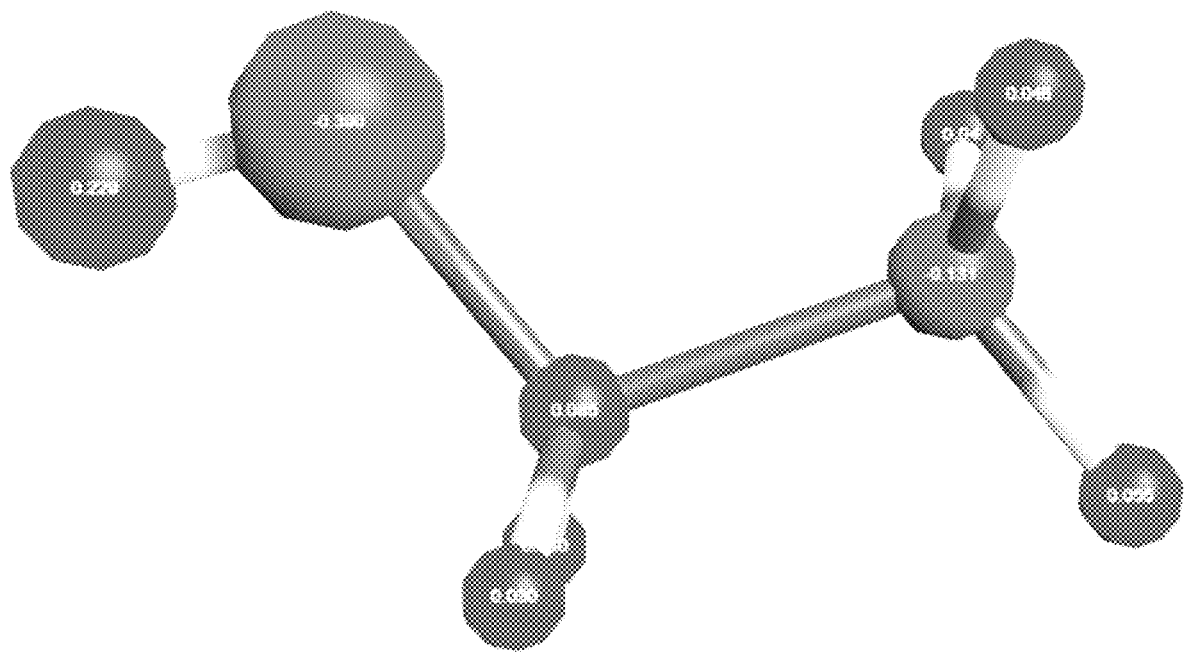
FIG. 27 is a schematic partial charge diagram of ethanol.

The contour peaks at 130/7.1 ppm may be caused by the introduced PSA. During the acid-catalysed fractionation, carbonium is generated at the a position in lignin fragments (FIG. 24). The highly reactive carbonium reacts with the electron-rich benzene ring, which is affected by the electronegativity of the carbon atom and the steric hindrance of the substituent. Phenol has an electron-rich benzene ring (FIG. 25) and thus reacts with lignin mainly through C6 ($\delta$=−0.244) or C2 ($\delta$=−0.201). Unlike phenol, due to the electron-withdrawing effect of the sulfonic acid group, the benzene ring in PSA has fewer electrons ($\delta$O8 or $\delta$C12=−0.178) than the phenolic hydroxyl group ($\delta$O=−0.317) (FIG. 26). Similar to ethanol ($\delta$O6=−0.390) (FIG. 27), the phenolic hydroxy group in PSA may be highly reactive. Thus PSA may react with lignin fragments through both the phenolic hydroxyl group and the benzene ring (FIG. 24). However, further studies (e.g., a detailed study of the hydrolytic cleavage of a lignin model dimer such as guaiacylglycerol-β-guaiacyl ether) by PSA would be needed to verify these reactions between PSA and lignin.

Due to depolymerization, both the solubilized and deposited lignin fractions have lower molecular weights than untreated lignin. The solubilized lignin fraction has a larger molecular weight relative to the deposited lignin fraction, which is consistent with the result of more inter-unit linkages (e.g., β-O-4, β-5 and β-β) remaining in the solubilized lignin fraction (Table 2).

Figure 28:
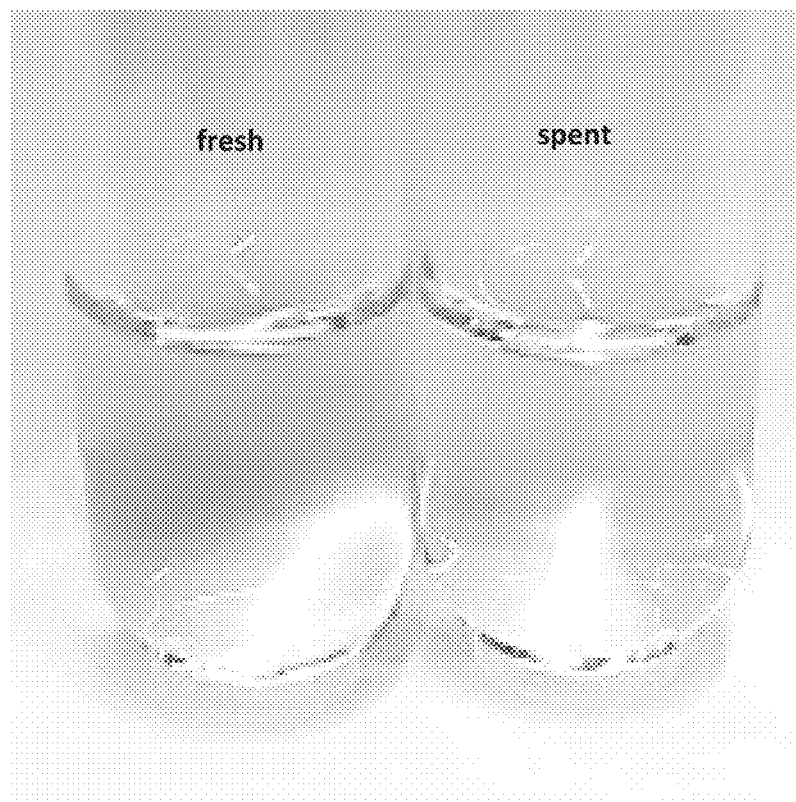
FIG. 28 comprises photos of fresh and spent PSA.

After fractionation, about 98.3% PSA was recycled by ethanol extraction (FIG. 3 and FIG. 28). The loss of PSA may be partially attributable to the PSA reacting with the lignin fragments during fractionation. In the tests described herein, the recycled PSA was diluted to a 72% aqueous solution that was used to directly fractionate the fresh poplar chips. The results shown in FIG. 46 reveal that the recycled PSA exhibited performance (lignin isolation %) during $2^{nd}$ and $3^{rd}$ runs that is substantially similar to the performance fresh PSA.

Mesoscale Solubilization of Lignin

Figure 29:
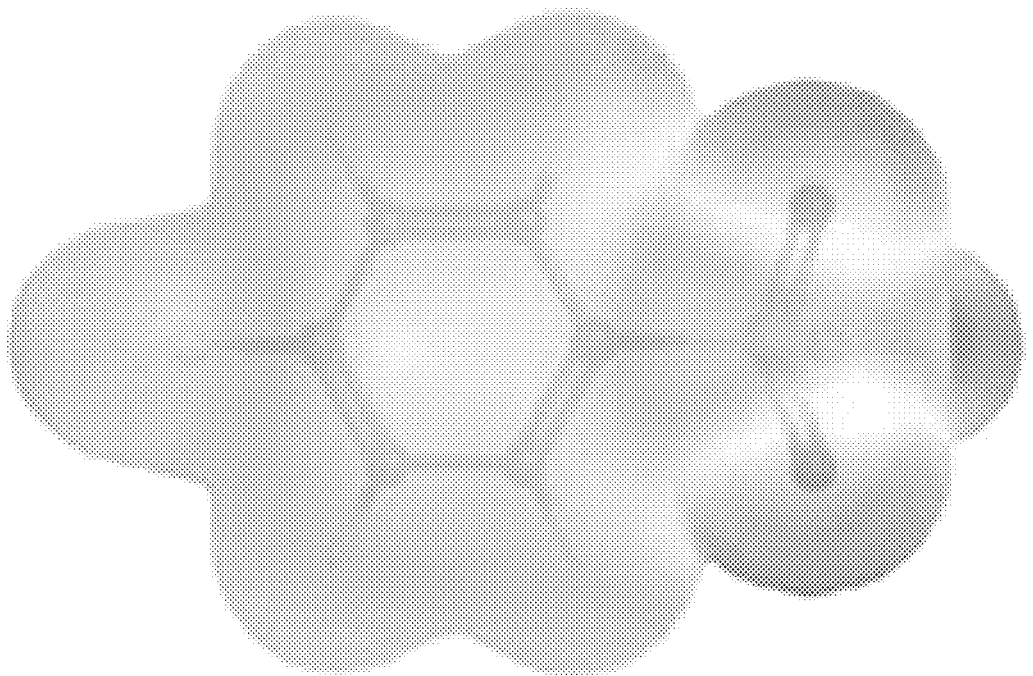
FIG. 29 is a schematic showing the electrostatic potential surface diagram of PSA.
Figure 30:
FIG. 30 is an optical microscope photo (scale bar: 1 mm) showing separated cellulose fibres obtained at about 50° C. and about 180 minutes.
Figure 31:
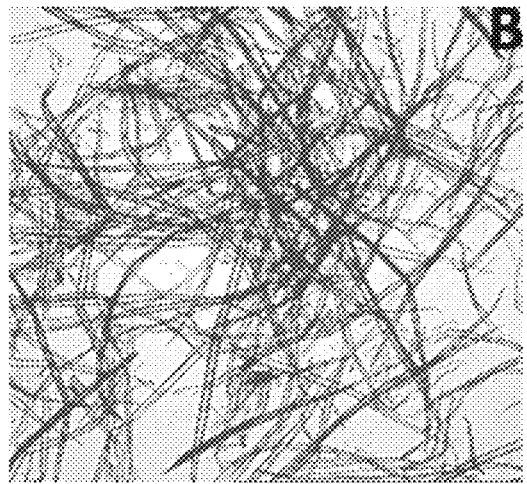
FIG. 31 is an optical microscope photo (scale bar: 1 mm) showing separated cellulose fibres obtained at about 60° C. and about 120 minutes.
Figure 32:
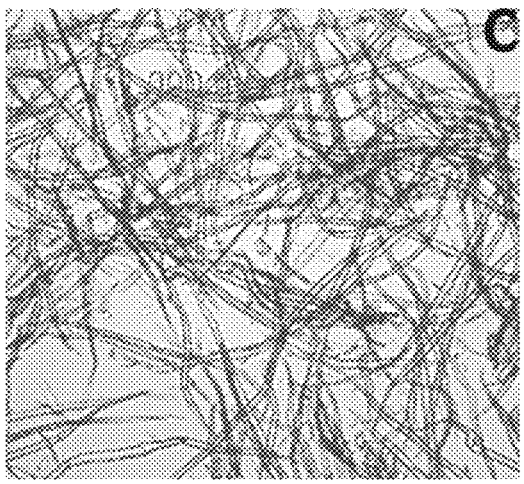
FIG. 32 is an optical microscope photo (scale bar: 1 mm) showing separated cellulose fibres obtained at about 70° C. and about 90 minutes.
Figure 33:
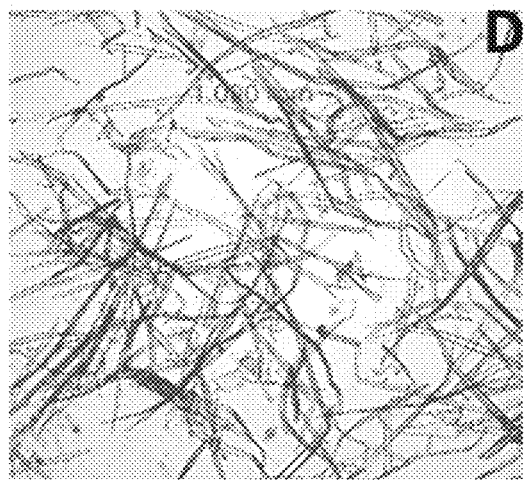
FIG. 33 is an optical microscope photo (scale bar: 1 mm) showing separated cellulose fibres obtained at about 80° C. and about 30 minutes.
Figure 34:
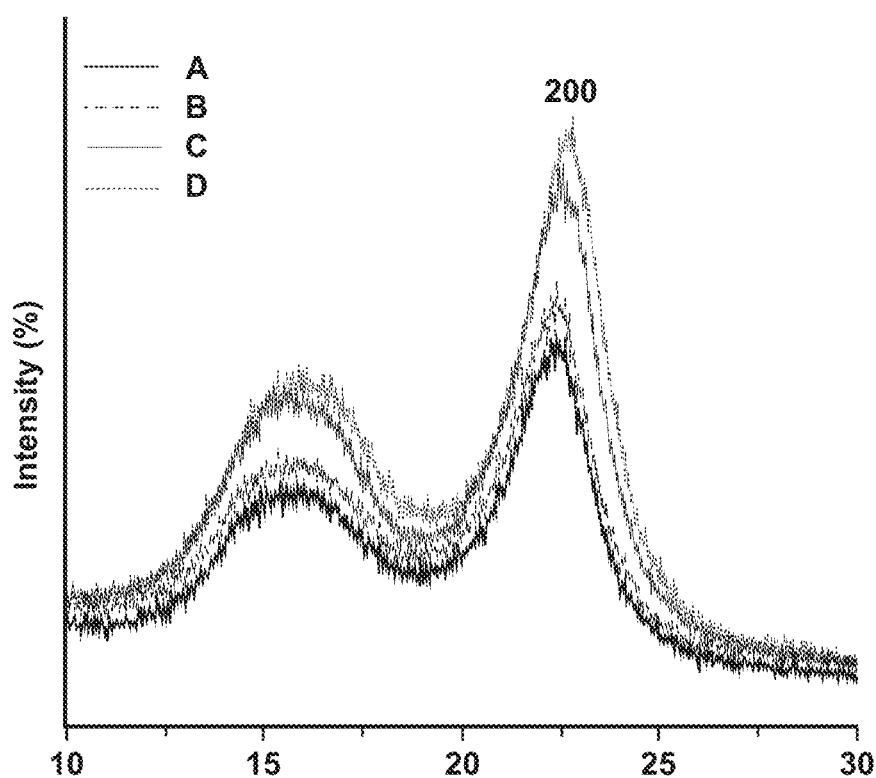
FIG. 34 is a graph showing XRD spectra for separated cellulose fibres obtained under the conditions of FIGS. 30-33.
Figure 35:
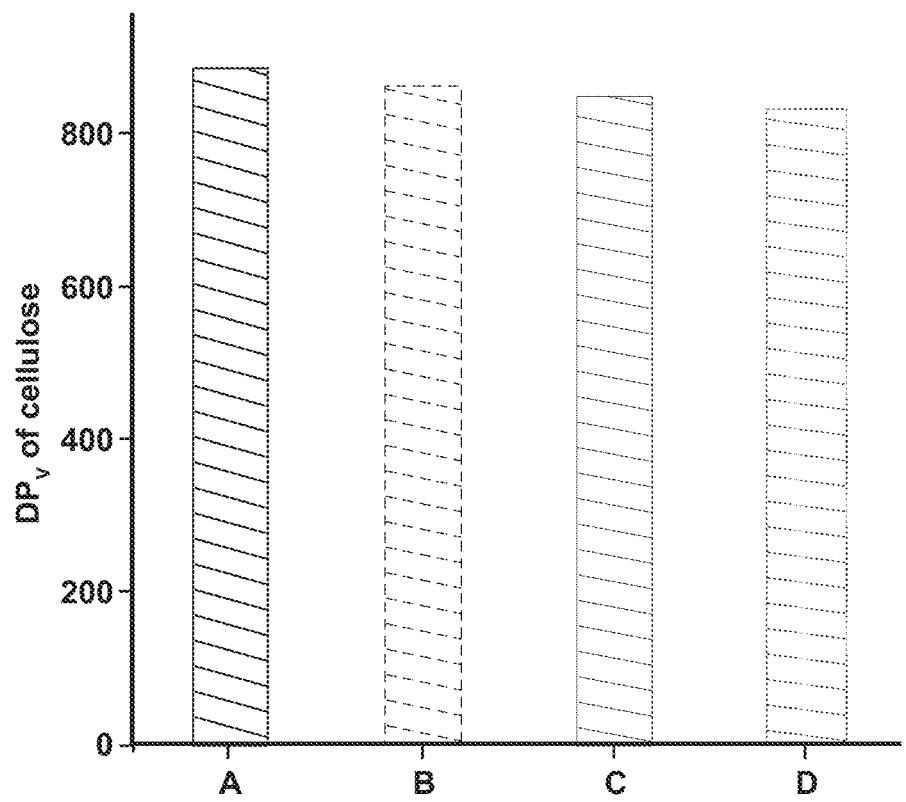
FIG. 35 is a chart showing the degree of polymerization for separated cellulose fibres obtained under the conditions of FIGS. 30-33.
Figure 36:
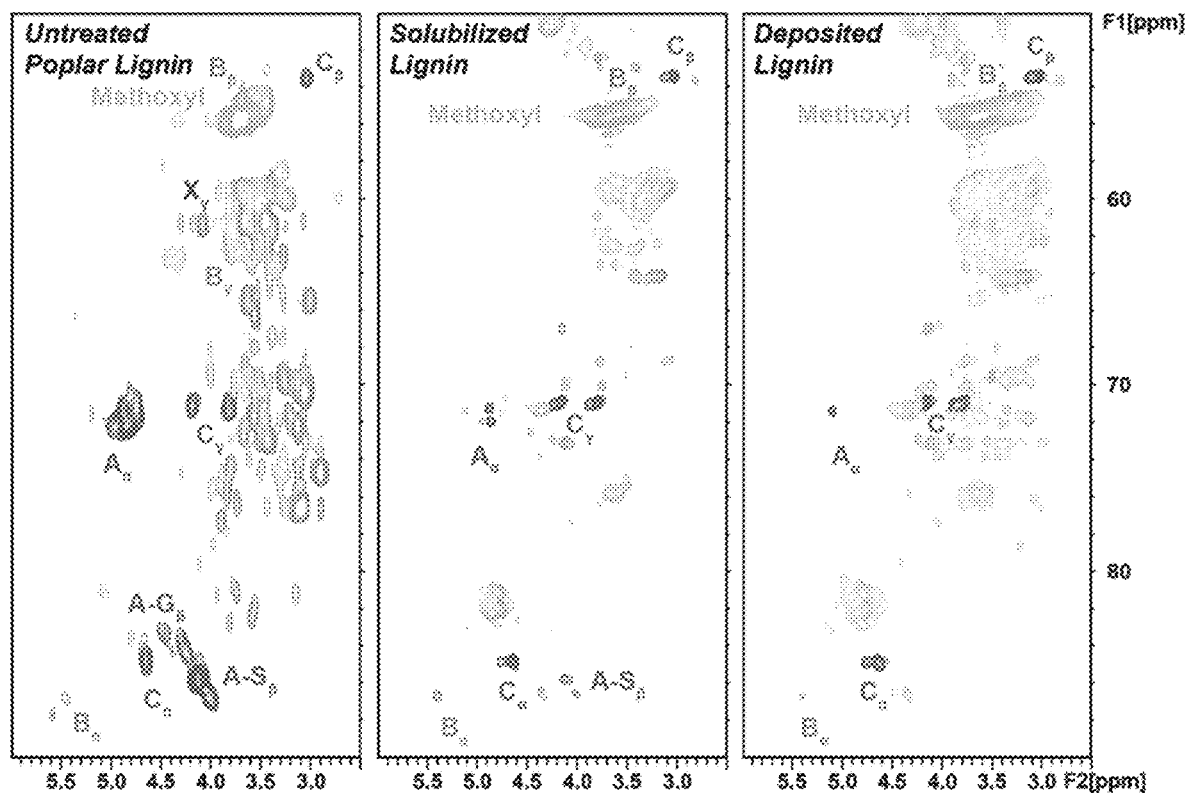
FIG. 36 shows the 2D HSQC NMR spectra of untreated and isolated (the solubilized and deposited fractions) of poplar lignin samples.
Figures 37, 38, 39, 40:
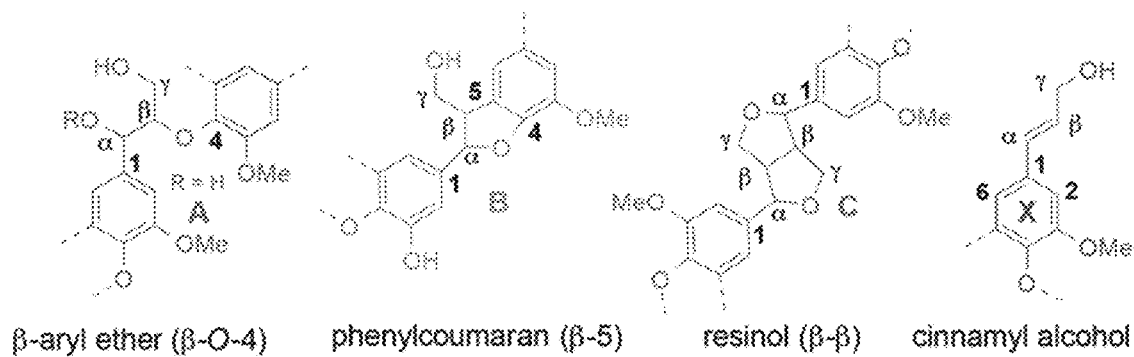
FIG. 37 is a schematic showing β-aryl ether (β-0-4)
FIG. 38 is a schematic showing phenylcoumaran (β-5)
FIG. 39 is a schematic showing resinol (β-β)
FIG. 40 is a schematic showing cinnamyl alcohol.
Figure 41:
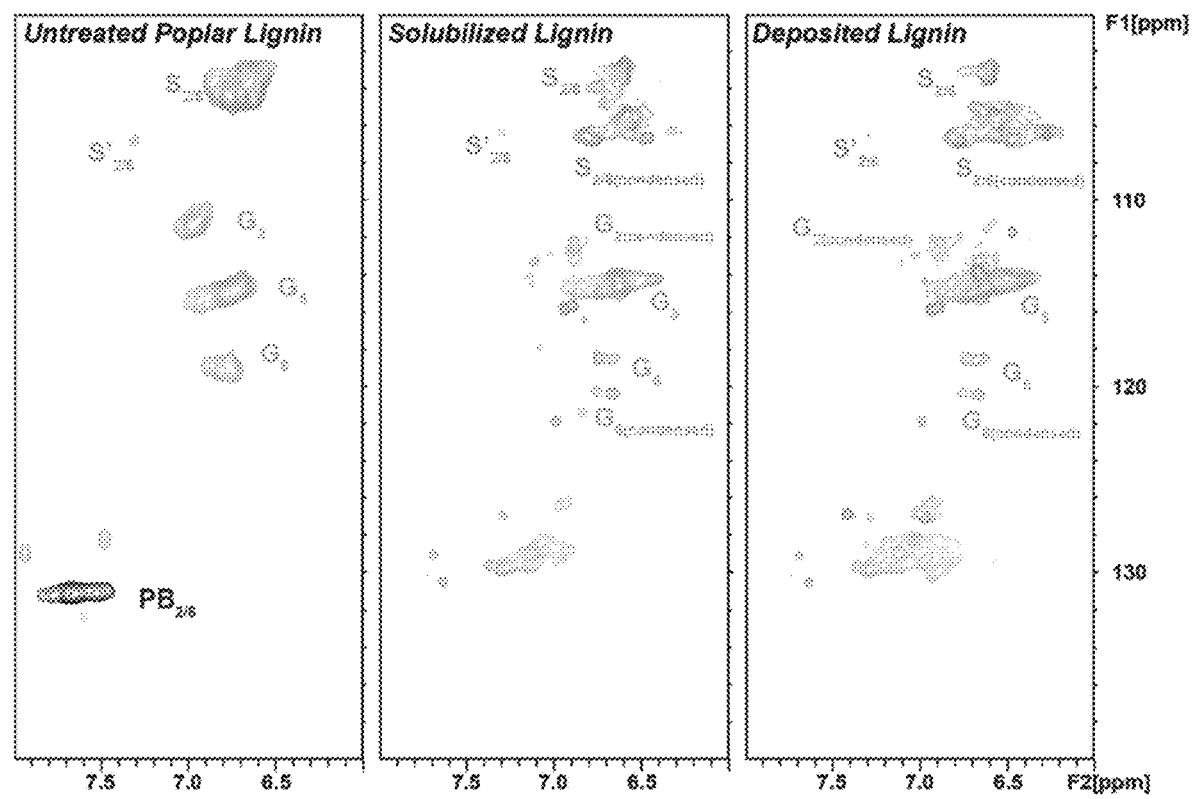
FIG. 41 shows the 2D HSQC NMR spectra of untreated and isolated (the solubilized and deposited fractions) of poplar lignin samples.
Figures 42, 43, 44, 45:
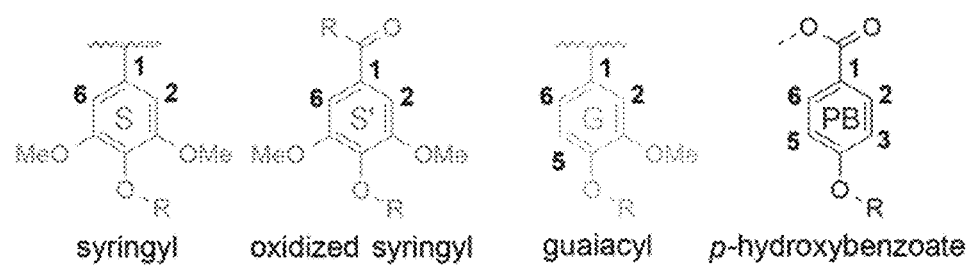
FIG. 42 is a schematic showing syringyl.
FIG. 43 is a schematic showing oxidized syringyl.
FIG. 44 is a schematic showing gualacyl.
FIG. 45 is a schematic showing p-hydroxybenzoate.
Figure 46:
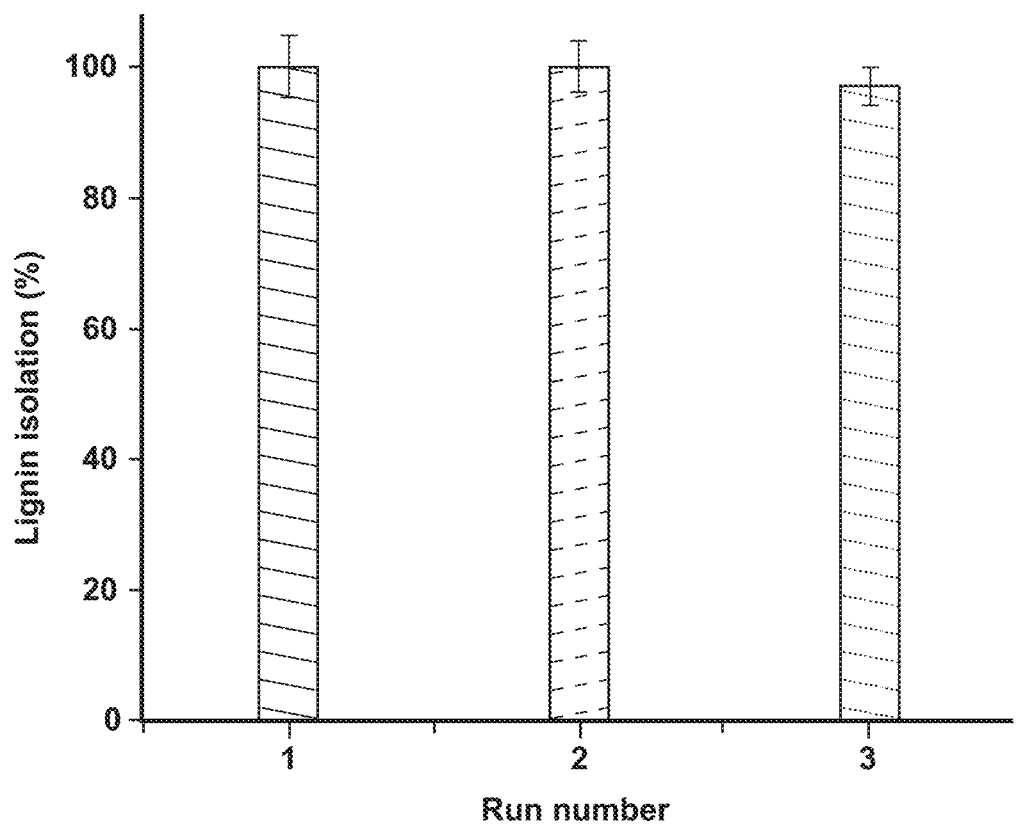
FIG. 46 is a chart showing reusability of PSA.
Figure 47:
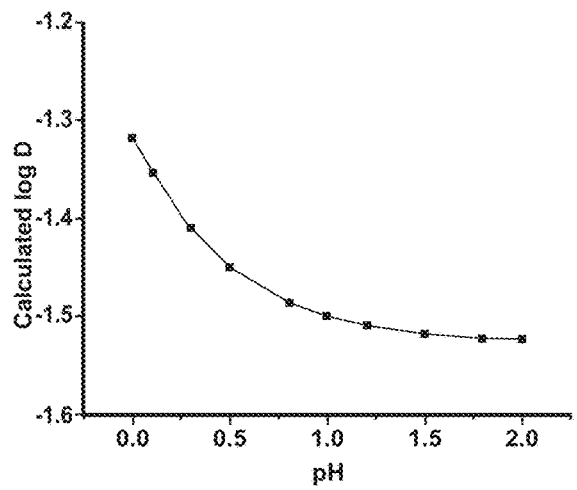
FIG. 47 is a graph showing calculated log D value of PSA.
Figure 48:
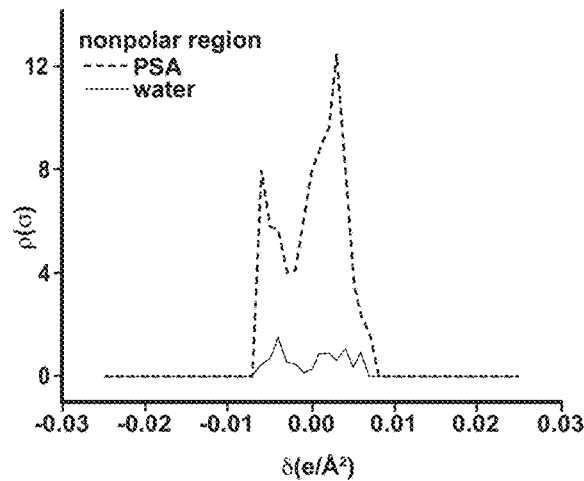
FIG. 48 is a graph showing calculated sigma profiles and potentials of PSA.
Figure 49:
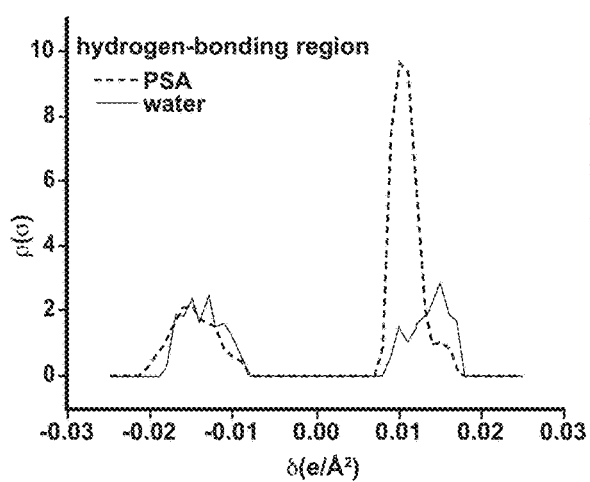
FIG. 49 is a graph showing calculated sigma profiles and potentials of PSA.
Figure 50:
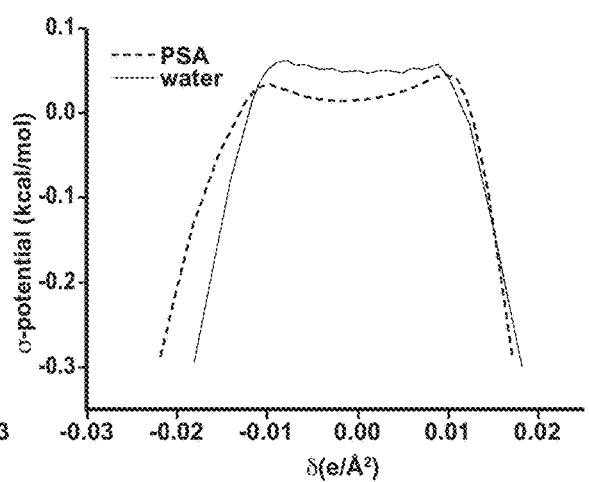
FIG. 50 is a graph showing calculated sigma profiles and potentials of PSA.

As discussed above, PSA may act as a catalyst and also as solvent to both dissolve and protect lignin fragments in tandem during the fractionation of woody biomass (e.g. poplar chips). PSA is a small amphiphile and a hydrotrope, because it includes a hydrophobic benzene ring and hydrophilic phenolic hydroxyl and sulfonic acid groups. To estimate the hydrophobicity of PSA, log D (log $K_{ow}$, a log of partition coefficient of PSA between octanol and water at pH=0-2) value was calculated using ChemAxon. The calculated log D value ranges from about −1.52 to about −1.35 (FIGS. 47-50). As an amphiphile, PSA may form hydrogen bonding through the phenolic hydroxyl and sulfonic acid groups and also may have hydrophobic interaction through the benzene ring. To test this hypothesis, the polarity and the hydrogen-bonding and hydrophobic interaction potentials of PSA were visualized and calculated. The polarity of PSA was visualized via an electrostatic potential surface diagram (EPS, red: negative region, blue: positive region, green/yellow: neutral region) using the Mopac/PM3 method (FIG. 29). Apparently, the phenolic hydroxyl and sulfonic acid groups are polar, while the benzene ring is nonpolar. The hydrogenbonding and hydrophobic interaction potentials of PSA were calculated through the sigma profiles and sigma potential using the COSMO-RS method (water as a reference). The nonpolar profile ($-0.007$ e Å$^{-2}$<$\sigma$<$0.007$ e Å$^{-2}$) shows that the benzene ring of PSA is hydrophobic and thus may have hydrophobic interactions. The hydrogen-bonding profile ($\sigma$<$-0.007$ e Å$^{2}$ and $\sigma$>$0.007$ e Å$^{-2}$) shows that PSA may act as a hydrogen bond donor ($\delta^{+}$H) and acceptor ($\delta^{-}$O).

The sigma potential may be divided into three regions: $\sigma$<$-0.007$ e Å$^{2}$ (affinity for hydrogen bond donor), $-0.007$ e Å$^{-2}$<$\sigma$<$0.007$ e Å$^{2}$ (affinity for hydrophobic interaction) and $\sigma$>$0.007$ e Å$^{-2}$ (affinity for hydrogen bond acceptor).

Figure 51:
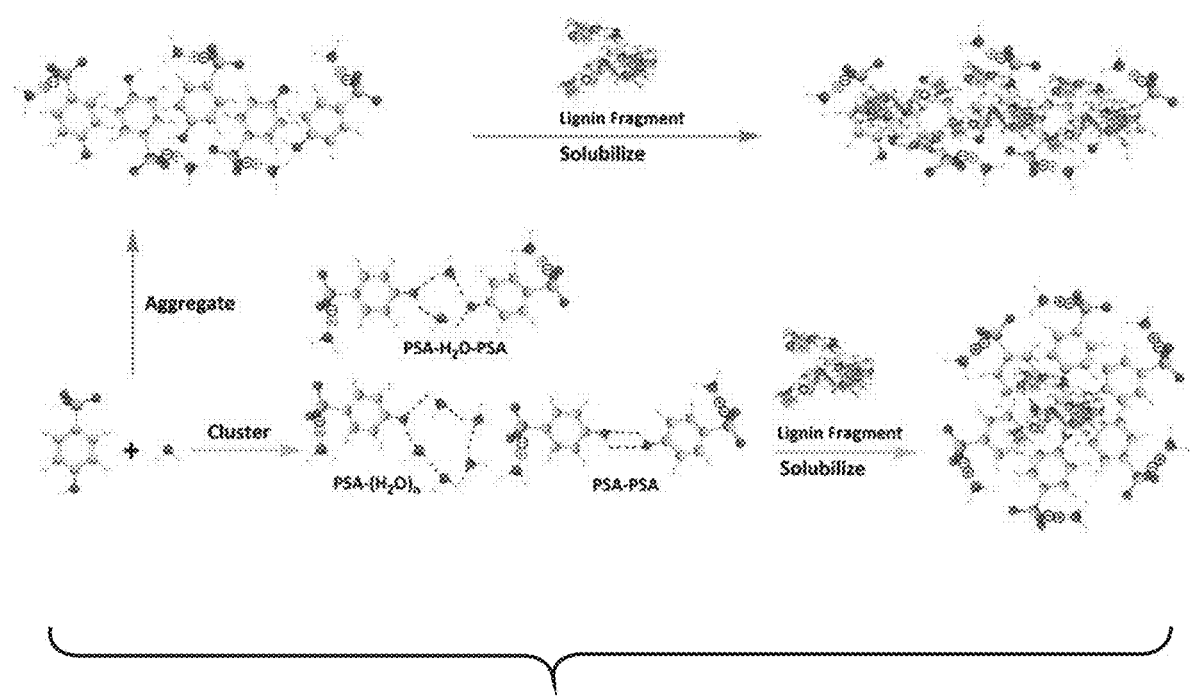
FIG. 51 is a schematic illustration of the aggregation and clustering of PSA and the solubilization of lignin fragments by PSA.

The calculated hydrophobicity and hydrogen-bonding and hydrophobic interaction potentials suggest that PSA, as a small amphiphile, could cluster and aggregate in water. PSA may form various (PSA), aggregates, (PSA), clusters, PSA-(water), clusters and PSA-(water)$_n$-PSA clusters (i.e. possible similar to phenol). Above a critical aggregation concentration ($C_{ac}$, also referred to as minimum hydrotrope concentration), PSA in water may form stack-type (nonmicelle) aggregates due to the hydrophobic effect. In the PSA aggregate, the phenolic hydroxyl and sulfonic acid groups point outward to water (FIG. 51). Due to hydrophobic effect, π-π stacking and π-polar interaction, the PSA aggregate may attract and solubilize the hydrophobic and hydroxyl-containing lignin fragment by forming a temporary complex with it (FIG. 51). However, the PSA cluster may uncluster and then accumulate around the hydrophobic lignin fragment due to the hydrophobic effect. Therefore, PSA may solubilize lignin fragments in water via its aggregates and accumulate around them. Solubilization caused by noncovalent interactions may be fully reversible. Upon dilution with water, the solubilized lignin fragment is released from PSA back to water, which enables recovery of lignin and PSA. In addition, different from the PSA aggregates that solubilize lignin fragments and protect them from further structural alterations, the PSA clusters might depolymerize/condense lignin fragments and lignin particles. This possibility may explain why the deposited lignin fraction has fewer interunit linkages and a smaller molecular weight (Tables 1 and 2) compared with the solubilized lignin fraction that is protected.

Figure 52:
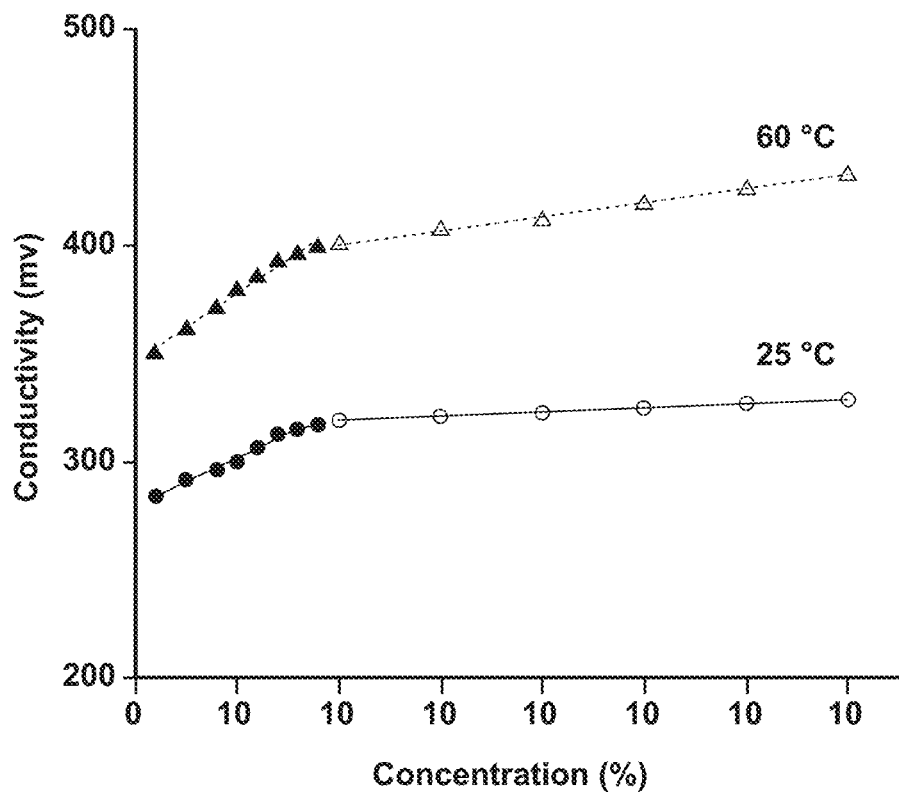
FIG. 52 is a graph showing measurements of the critical aggregation concentration of PSA.
Figure 53:
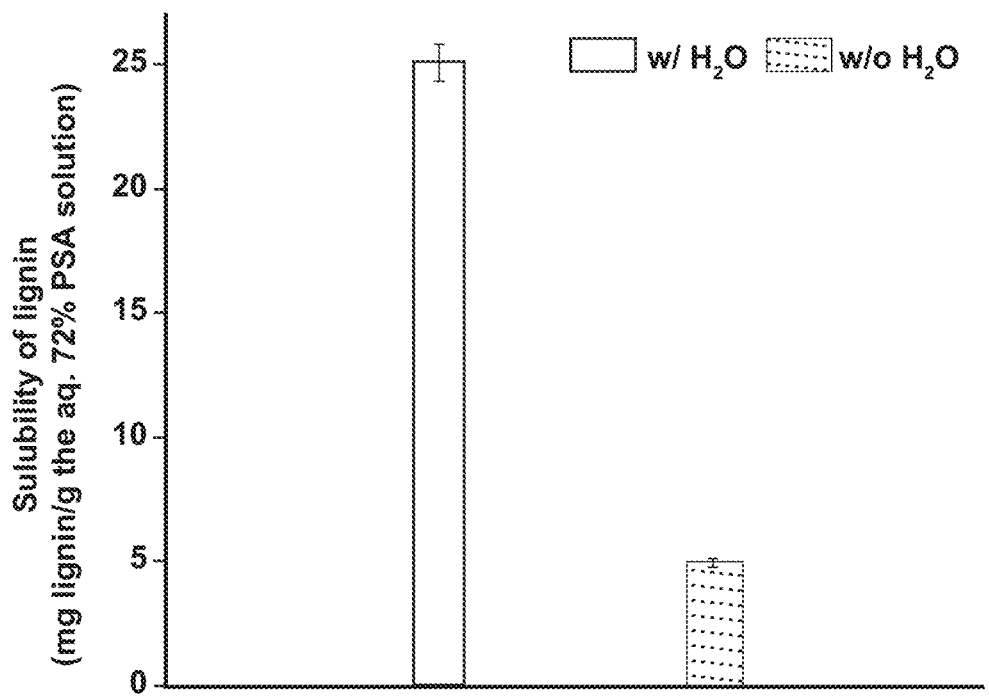
FIG. 53 is a chart showing linin solubility in PSA.

To test the aggregation hypothesis, the $C_{ac}$ values of PSA in water were measured at about 25° C. and about 60° C. from conductivity concentration plots (FIGS. 52-53). The results suggest that PSA started to aggregate in water when its concentration was above about 16.8% at about 60° C. or about 18.6% at about 25° C. However, measurements of aggregate parameters (e.g., the number of molecules required to form aggregates, and the type and size) using small-angle neutron scattering may be beneficial with regards to determining the aggregation behaviour of PSA in water. During the testing described herein, the aqueous PSA solution solubilized lignin fragments in water. Specifically, one gram of the aqueous PSA solution (about 72%) was able to solubilize about 25 mg technical lignin ($M_w$=3505 g mol$^{-1}$) at about 25° C. Upon dilution to below about 18.6% at about 25° C., lignin quickly precipitated from the aqueous PSA solution (not shown). Compared with the aqueous 72% PSA solution, one gram of anhydrous liquid PSA, in which molecules exist as clusters due to the intermolecular hydrogen bonding, only solubilized about 5 mg technical lignin (referred to as molecular-scale solubilization). The difference in efficiency between the mesoscale solubilization and the molecular-scale solubilization suggests that the hydrophobic effect may be mainly responsible for the solubilization of lignin by the aqueous PSA solution.

In general, the solubilization of lignin fragments by the aqueous PSA solution may be different during fractionation. The unfractionated lignocellulose, the fractionated cellulose fibers and the deposited lignin fragments may compete for the aqueous PSA solution with the lignin fragments. Also, the lignin fragments solubilized by PSA may be deposited/distributed on the surfaces of cellulose fibers and fibril networks. Thus, the amounts of lignin fragments solubilized by the aqueous PSA solution might be underestimated through a filtration process (FIG. 3). For example, after the fractionation was carried out at about 60° C. for 2 hours, one gram of the aqueous PSA solution (72%) only carried 5 mg lignin fragments (i.e., the solubilized lignin fraction).

Concentrated aqueous PSA solution (e.g., at least about 72 wt %) can completely or near-completely fractionate woody biomass (e.g. centimetre-sized poplar chips) into high quality cellulose fibres, fermentable hemicellulose sugars, and lignin fragments in theoretical maximum yields under mild conditions (e.g., about 50° C.-about 80° C., about 0.5-3 hours, atm). PSA may also be utilized to fractionate other woody biomass types (e.g. centimetre-sized). Calculations and experimental results suggest that PSA, as a small amphiphile, could form various aggregates and clusters in water. Besides being a selective catalyst, PSA acts as a mesoscale solvent to solubilize lignin fragments. PSA can hypothetically solubilize lignin fragments through aggregates to attract and form complexes with them due to the hydrophobic effect and n interactions. PSA also can solubilize the lignin fragments via accumulating around them due to the hydrophobic effect. Considering that PSA can be synthesized from lignin-derivable phenol through sulfonation, PSA has the potential to allow a "closed-loop" fractionation process to be realized.

It is also to be understood that variations and modifications can be made to the aforementioned structures and methods without departing from the concepts of the present process, and further it is to be understood that such concepts are intended to be covered by the following claims unless these claims by their language expressly state otherwise.

What is claimed is:

1. A method of fractionating lignocellulosic biomass, the method comprising:
    fractionating lignocellulosic biomass in an aqueous phenol-4-sulfonic acid (PSA) comprising at least about 60% weight percentage PSA at a temperature of about 50° C.-80° C. for about 0.5 hours to about 3.0 hours to form a mixture comprising fractionated woody biomass and adsorbed PSA.

2. The method of claim 1, wherein:
    the lignocellulosic biomass comprises unmilled wood chips having dimensions of about 0.098-1.18 inches in length×0.079-0.79 inches in width×0.04-0.24 inches in thickness.

3. The method of claim 1, wherein:
    the mixture comprises a first mixture; and including:
    filtering the first mixture to separate a first solid material from a first filtrate liquid;
    adding water to the first filtrate liquid to form diluted first filtrate liquid;
    filtering the diluted first filtrate liquid to form a second filtrate liquid and a second solid material, wherein the second solid material comprises lignin.

4. The method of claim 3, including:
    rinsing the first solid material with alcohol to form a third solid material and an alcohol solution;
    bleaching the third solid material to form cellulose.

5. The method of claim 4, including:
    adding water to the alcohol solution to form a diluted alcohol solution;
    filtering the diluted alcohol solution to form a fourth solid material and a third filtrate liquid wherein the fourth solid material comprises lignin.

6. The method of claim 5, including:
    causing liquid to evaporate from the second filtrate liquid and the third filtrate liquid to form a sugar-containing material;
    adding alcohol to the sugar-containing material to form a sugar-containing mixture;
    mixing the sugar-containing mixture with PSA to form solid hemicellulose sugars and a liquid solution;
    causing liquid to evaporate from the liquid solution to thereby recover PSA from the liquid solution.

7. The method of claim 1, wherein:
    the fractionated woody biomass has a lignin isolation % of at least 90%.

8. The method of claim 7, wherein:
    the fractionated woody biomass has a lignin isolation % of at least 99%.

9. The method of claim 8, wherein:
    the weight % of PSA is at least 72%.

10. The method of claim 1, wherein:
    fractionation is completed in less than about 1.5 hours.

* * * * *